United States Patent
Kamada et al.

(10) Patent No.: US 10,699,110 B2
(45) Date of Patent: Jun. 30, 2020

(54) IMAGE PROCESSING APPARATUS, IMAGE PROCESSING METHOD, AND NON-TRANSITORY RECORDING MEDIUM STORING PROGRAM FOR CAUSING COMPUTER TO EXECUTE IMAGE PROCESSING METHOD

(71) Applicants: Takuji Kamada, Kanagawa (JP); Satoshi Ouchi, Tokyo (JP)

(72) Inventors: Takuji Kamada, Kanagawa (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 15/861,635

(22) Filed: Jan. 3, 2018

(65) Prior Publication Data

US 2018/0211106 A1    Jul. 26, 2018

(30) Foreign Application Priority Data

Jan. 26, 2017   (JP) .................. 2017-011844

(51) Int. Cl.
*G06K 9/00*    (2006.01)
(52) U.S. Cl.
CPC ..... *G06K 9/00449* (2013.01); *G06K 9/00456* (2013.01); *G06K 9/00463* (2013.01)

(58) Field of Classification Search
None
See application file for complete search history.

(56) References Cited

U.S. PATENT DOCUMENTS

| | | | |
|---|---|---|---|
| 5,416,308 A * | 5/1995 | Hood | G06K 9/2054 |
| | | | 235/454 |
| 2007/0025627 A1 | 2/2007 | Hasegawa et al. | |
| 2009/0016613 A1 | 1/2009 | Hasegawa et al. | |
| 2011/0243374 A1 * | 10/2011 | Huang | H04N 1/32224 |
| | | | 382/100 |
| 2017/0270359 A1 | 9/2017 | Ouchi et al. | |

FOREIGN PATENT DOCUMENTS

| | | |
|---|---|---|
| JP | 2-210586 | 8/1990 |
| JP | 2001-222683 | 8/2001 |
| JP | 2007-060619 | 3/2007 |
| JP | 2009-037596 | 2/2009 |
| JP | 2017-118480 | 6/2017 |
| JP | 2017-175213 | 9/2017 |

* cited by examiner

*Primary Examiner* — Chan S Park
*Assistant Examiner* — Elisa M Rice
(74) *Attorney, Agent, or Firm* — Duft & Bornsen, PC

(57) ABSTRACT

An image processing apparatus includes a detector to detect, from a multi-value image, a table that can display a character in each of a plurality of cells delimited by a plurality of ruled lines and a conformation unit that determines how to conform a color of a constituent element in the table based on information of the element in the table detected by the detector.

10 Claims, 16 Drawing Sheets

(1). TRUE BLACK COLOR
(2). BLACK COLOR
(3). NEUTRAL COLOR
(4). GRAY (NEWSPAPER GROUND) COLOR
(5). WHITE COLOR

FIG. 11A
FIG. 11B
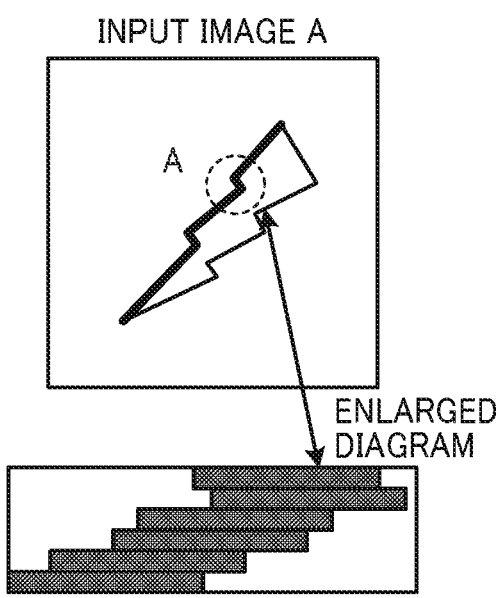
INPUT IMAGE A
ENLARGED DIAGRAM
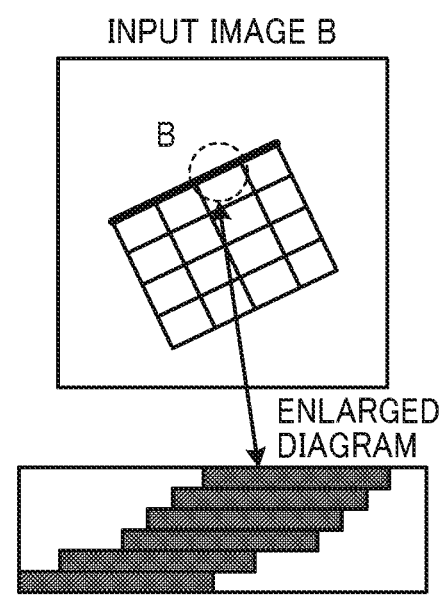
INPUT IMAGE B
ENLARGED DIAGRAM

US 10,699,110 B2

IMAGE PROCESSING APPARATUS, IMAGE PROCESSING METHOD, AND NON-TRANSITORY RECORDING MEDIUM STORING PROGRAM FOR CAUSING COMPUTER TO EXECUTE IMAGE PROCESSING METHOD

CROSS-REFERENCE TO RELATED APPLICATION

This patent application is based on and claims priority pursuant to 35 U.S.C. § 119 to Japanese Patent Application No. 2017-011844, filed on Jan. 26, 2017 in the Japanese Patent Office, the entire disclosure of which is hereby incorporated by reference herein.

BACKGROUND

Technical Field

The present disclosure relates to an image processing apparatus, an image processing method, and a non-transitory recording medium storing a program for causing a computer to execute the image processing method.

Background Art

A high-compression portable document format (high-compression PDF) is known as a technique for increasing the compression rate and the image quality of a PDF. The high-compression PDF separates a multi-value image into a character region and a non-character region and applies compression processing (for example, MMR or JPEG) suitable for each of the character region and the non-character region, thereby achieving high compression.

SUMMARY

This specification describes an improved image processing apparatus. In one illustrative embodiment, the image processing apparatus includes a detector to detect, from a multi-value image, a table that can display a character in each of a plurality of cells delimited by a plurality of ruled lines; and a conformation unit that determines how to conform a color of a constituent element in the table based on information of the element in the table detected by the detector.

This specification further describes an improved image processing method. In one illustrative embodiment, the image processing method includes detecting, from a multi-value image, a table that can display a character in each of a plurality of cells delimited by a plurality of ruled lines; and switching a method of conforming a color of a constituent element in the table based on information of the element in the table detected by the detecting.

This specification further describes a non-transitory recording medium including a improve computer program. In one illustrative embodiment, the computer program causes a computer to execute detecting, from a multi-value image, a table that can display a character in each of a plurality of cells delimited by a plurality of ruled lines; and switching a method of conforming color of a constituent element in the table based on information of the element in the table detected by the detecting.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 11A is an explanatory diagram illustrating an example of an input image A including a diagonal ruled line where erroneous detection occurs;

FIG. 11B is an explanatory diagram illustrating an example of an input image B including a diagonal ruled line where erroneous detection does not occur;

DETAILED DESCRIPTION OF EMBODIMENTS

Figure 1:
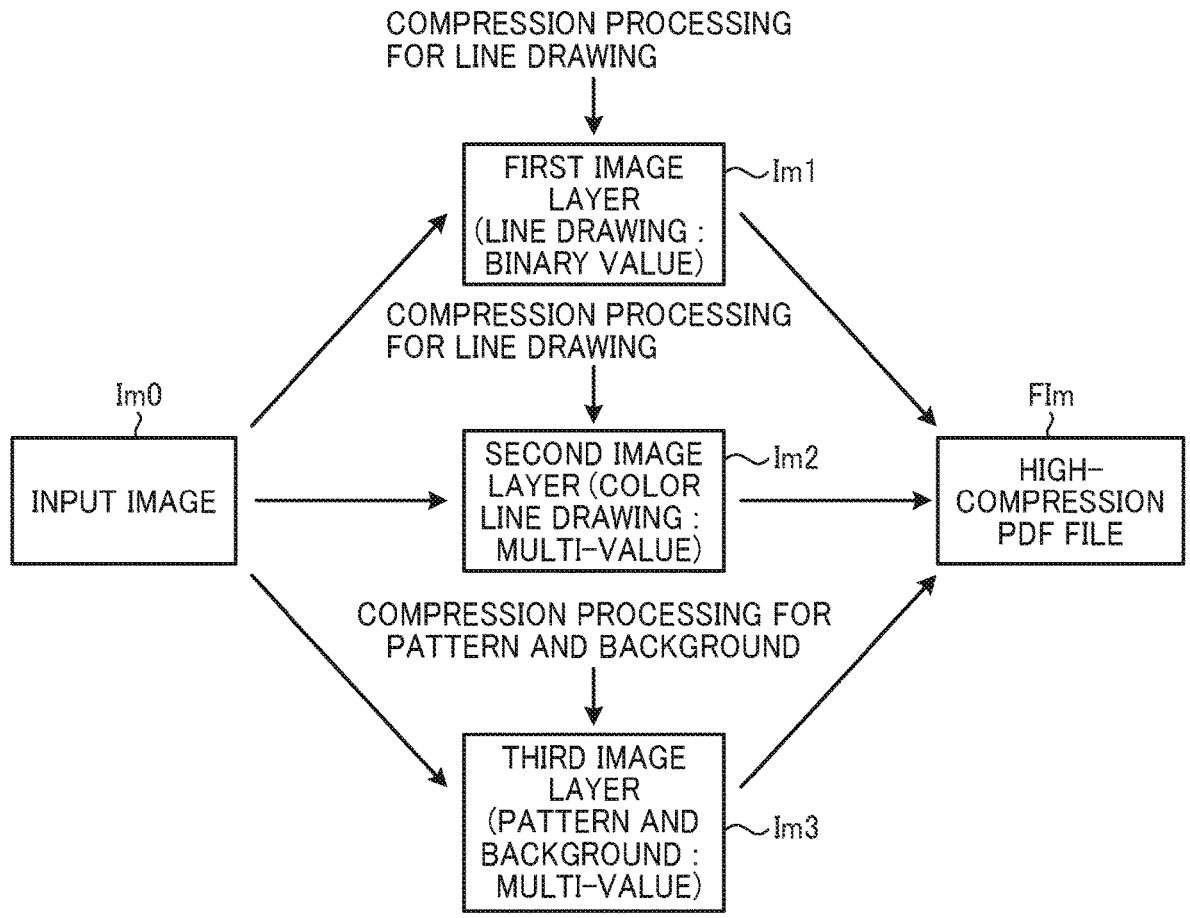
FIG. 1 is an explanatory schematic view illustrating the procedure of processing a high-compression PDF.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an" and "the" are intended to include the plural forms as well, unless the context clearly indicates otherwise.

The configurations related to the present disclosure are described based on embodiments illustrated in the accompanied drawings. It is to be noted that identical reference numerals are assigned to identical components or equivalents and description of those components is simplified or omitted.

Embodiments of an image processing apparatus, an image processing method, and a non-transitory recording medium storing a program for causing a computer to execute the image processing method according to the present disclosure are described in detail below with reference to the accompanying drawings.

Prior to a description of the present embodiment, an outline of high-compression PDF is described.

The high-compression PDF is an image compression technique for creating a high-compression PDF file from an image that includes a line drawing, such as a character. Here, the line drawing refers to the character and an object expressed by lines that is desirably treated in the same manner as the character. It is to be understood that even an object which is expressed by lines but may be desirably treated as a pattern is not included in the line drawing but in the pattern. The pattern refers to an object other than the line drawing, that is, an object such as a pattern that is expressed by halftone processing or an object such as graphics that are not desirably treated in the same manner as the character.

FIG. 1 is an explanatory schematic view illustrating the procedure of processing the high-compression PDF. The first step in the creation of the high-compression PDF file is creation of a first image layer Im1 that is a binary image of only a line drawing of the image, a second image layer Im2 that is a multi-value image for expressing the color of the line drawing, and a third image layer Im3 that is a multi-value image for expressing a background and a pattern other than the line drawing, which are created from a multi-value image (hereinafter referred to as "the input image") Im0 to be processed. Then, the first image layer Im1 and the second image layer Im2 are subjected to the compression processing that is suitable for compression of the line drawing, while the third image layer Im3 is subjected to the compression processing that is suitable for compression of the pattern and the background. Subsequently, the first image layer Im1 having been compressed, the second image layer Im2 having been compressed, and the third image layer Im3 having been compressed are, for example, integrated in one PDF image file, thereby creating a high-compression PDF file FIm corresponding to the input image Im0.

The compression processing applied to the first image layer Im1 may be implemented, for example, with an encoding scheme such as MMR for a binary image. The compression processing applied to the second image layer Im2 may be implemented, for example, with an encoding scheme such as JPEG for a multi-value image. A resolution of the compression processing applied to the second image layer Im2 may be smaller than that of the compression processing applied to the third image layer Im3. The compression processing for the first image layer Im1 and the compression processing for the second image layer Im2 are similar in being suitable for compression of the line drawing, and thus hereinafter are collectively referred to as "the first compression processing." The compression processing applied to the third image layer Im3 may be implemented, for example, with an encoding scheme such as JPEG for a multi-value image. A resolution of the compression processing applied to the third image layer Im3 may be greater than that of the compression processing applied to the second image layer Im2. The compression processing for the third image layer Im3 is suitable for compression of the pattern and the background, and thus hereinafter is referred to as "the second compression processing" so as to be distinguished from the first compression processing suitable for compression of the line drawing. It is to be noted that the above-described encoding schemes are merely an example, and thus an encoding scheme different from the aforementioned examples may also be employed for compression processing.

As described above, in the high-compression PDF technique, the input image Im0 to be processed is separated into the line drawing region and the other regions, such as the pattern and the background, so as to perform the first compression processing on the line drawing region and the second compression processing on the other region of the pattern and the background other than the line drawing. This makes it possible to provide increased efficiency of compression. Here, the efficiency of compression is expressed by how much the compression rate is increased without impairing the image quality (reproducibility) at the time of reproducing the image. It can be thus said that if a high compression rate is implemented while maintaining reproducibility, the compression is performed with good efficiency.

The aforementioned high-compression PDF technique can be modified in various ways. For example, the above-described first image layer Im1 may be divided into an image layer including only black line drawings and an image layer including only chromatic color or white line drawings. Further, without the second image layer Im2 expressing the color of the line drawing, the color of the line drawing may be provided as another piece of information corresponding to the coordinates of the line drawings.

Figure 2:
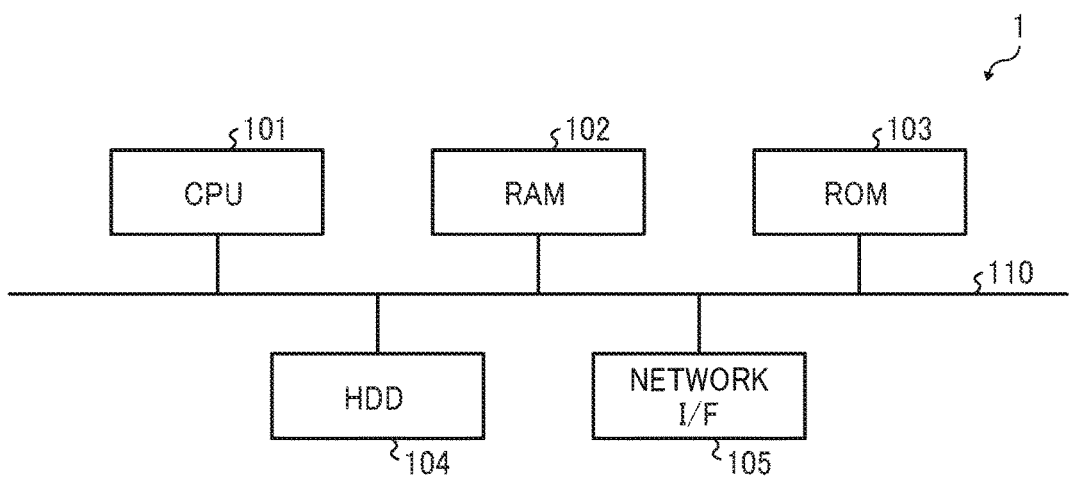
FIG. 2 is a block diagram illustrating a hardware configuration example of an image processing apparatus.

FIG. 2 is a block diagram illustrating a hardware configuration example of the image processing apparatus 1 of the present embodiment. As the hardware of the image processing apparatus 1, for example, it is possible to use a computer system such as a personal computer (PC). As illustrated in FIG. 2, the image processing apparatus includes a processor such as CPU 101, a storage device such as a random access memory (RAM) 102, read only memory (ROM) 103, and hard disk drive (HDD) 104, a network interface (I/F) 105 serving as a communication interface connected to a network such as local area network (LAN), and a bus 110 that connects these devices each other.

The image processing apparatus 1 of the present embodiment acquires the input image Im0, that is, the image to be processed, from, for example, a scanner or a host computer connected to the network via the network I/F 105. The image processing apparatus 1 creates the high-compression PDF file FIm by processing the input image Im0, stores the created high-compression PDF file FIm in the HDD 104, and send the high-compression PDF file to the host computer connected the network via the network I/F 105. A function of creating the high-compression PDF file FIm from the input image Im0 is realized, for example, by the CPU 101 using the RAM 102 as a work area and executing a predetermined program stored in the ROM 103, the HDD 104, or the like.

In addition, an image processing apparatus according to the present embodiment may be implemented as, for example, one of the functions of an image forming apparatus that includes scanner such as a copier and a multifunction peripheral. In this case, the image forming apparatus includes a computer system as illustrated in FIG. 2. Then, for example, the CPU 101 in the image forming apparatus uses the RAM 102 as a work area, executes a predetermined program stored in the ROM 103, the HDD 104, or the like, and realizes the function of creating the high-compression PDF file FIm from the input image Im0 obtained through the scanner or the network. Among a series of processes from receiving the input image Im0 to creation of the high-compression PDF file FIm, particularly, a process suitable for implementing as hardware may be realized by using dedicated hardware such as an ASIC (Application Specific Integrated Circuit).

Figure 3:
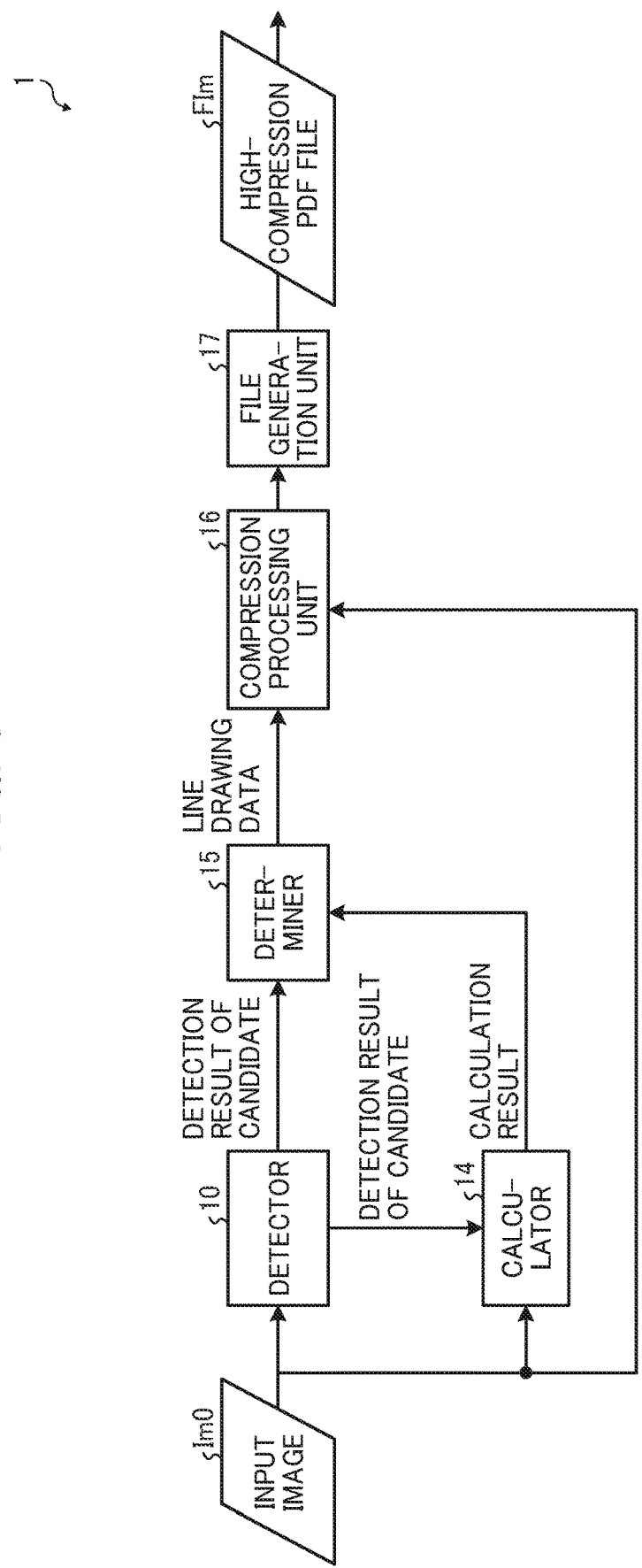
FIG. 3 is a functional block diagram of a configuration of the image processing apparatus.
Figure 4:
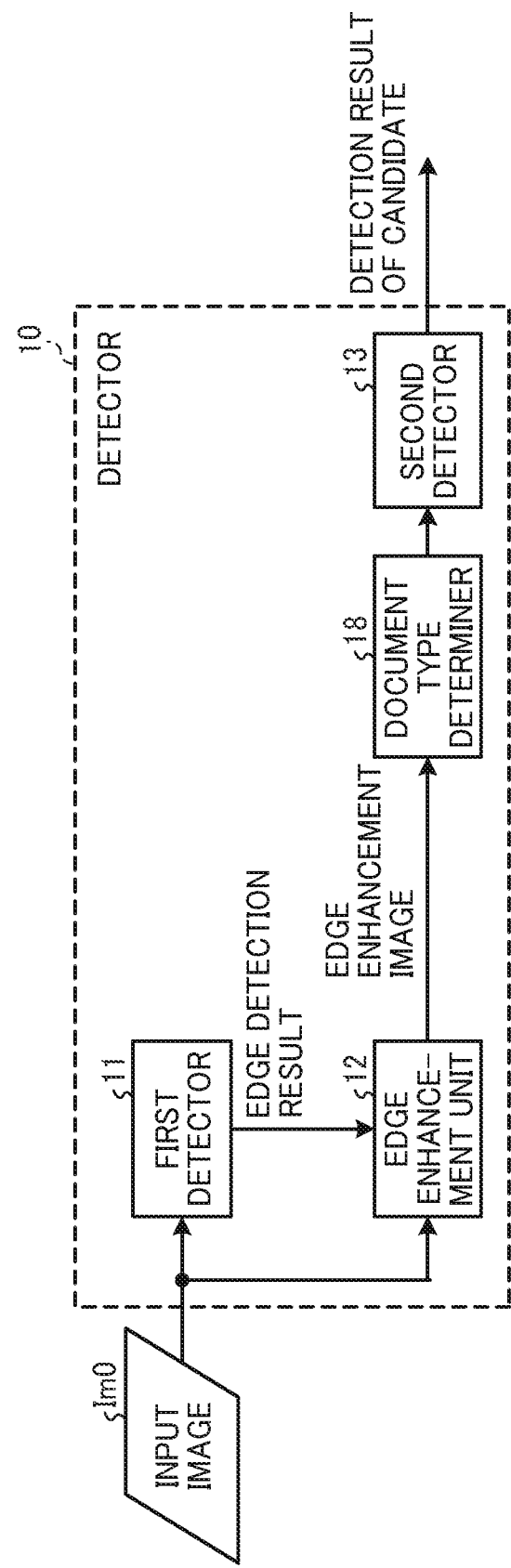
FIG. 4 is a functional block diagram illustrating a specific example of a detector.

FIG. 3 is a functional block diagram of a configuration of the image processing apparatus 1 of the present embodiment. As illustrated in FIG. 3, the image processing apparatus 1 includes, for example, a detector 10, a calculator 14, a determiner 15, a compression processing unit 16, and a file generation unit 17, which are functional parts realizing the function of creating the high-compression PDF file Fim from the input image Im0. In the image processing apparatus 1 of the present embodiment, the input image Im0 acquired as a processing target is input to the detector 10, the calculator 14, and the compression processing unit 16, and the high-compression PDF file FIm corresponding to the input image Im0 is outputted from the file generation unit 17. The detector 10 is a functional module that detects a line drawing candidate from the input image Im0 to be processed. FIG. 4 is a functional block diagram illustrating a specific example of the detector 10. For example, as illustrated in FIG. 4, the detector 10 includes a first detector 11, an edge enhancement unit 12, and a second detector 13 as submodules.

The first detector 11 detects an edge of the line drawing candidate with respect to the input image (the multi-value image) Im0 to be processed and outputs a detected result (hereinafter referred to as "an edge detection result"). For example, the processing performed by the first detector 11 is ternarizing the input image Im0, separating the line drawing such as a character and a halftone dot by using the continuity or pattern of black pixels or white pixels, and detecting the edge that makes a line drawing candidate. The edge detection result is, for example, coordinate data indicating a coordinate position of a pixel group detected as the edge of the line drawing candidate by the first detector 11 in the input image Im0. This edge detection result is input to the edge enhancement unit 12.

Using the edge detection result sent form the first detector 11, the edge enhancement unit 12 performs a process of emphasizing an edge of a line drawing candidate included in the input image Im0 to be processed and creates an edge-enhanced image in which the edge of the line drawing candidate is emphasized. Since the edge enhancement unit 12 performs an edge enhancement process by using the edge detection result of the first detector 11, there is little possibility of emphasizing the edge of the pattern included in the input image Im0. Therefore, it is possible to increase a degree of edge emphasis and create the edge-enhanced image in which the edge of the line drawing candidate is clearly emphasized. The edge-enhanced image created by the edge enhancement unit 12 is input to the second detector 13. Clearly emphasizing the edge of the line drawing candidate reduces the effect of a blunt end of the line drawing and improves accuracy of a document type determiner 18.

Figure 5:
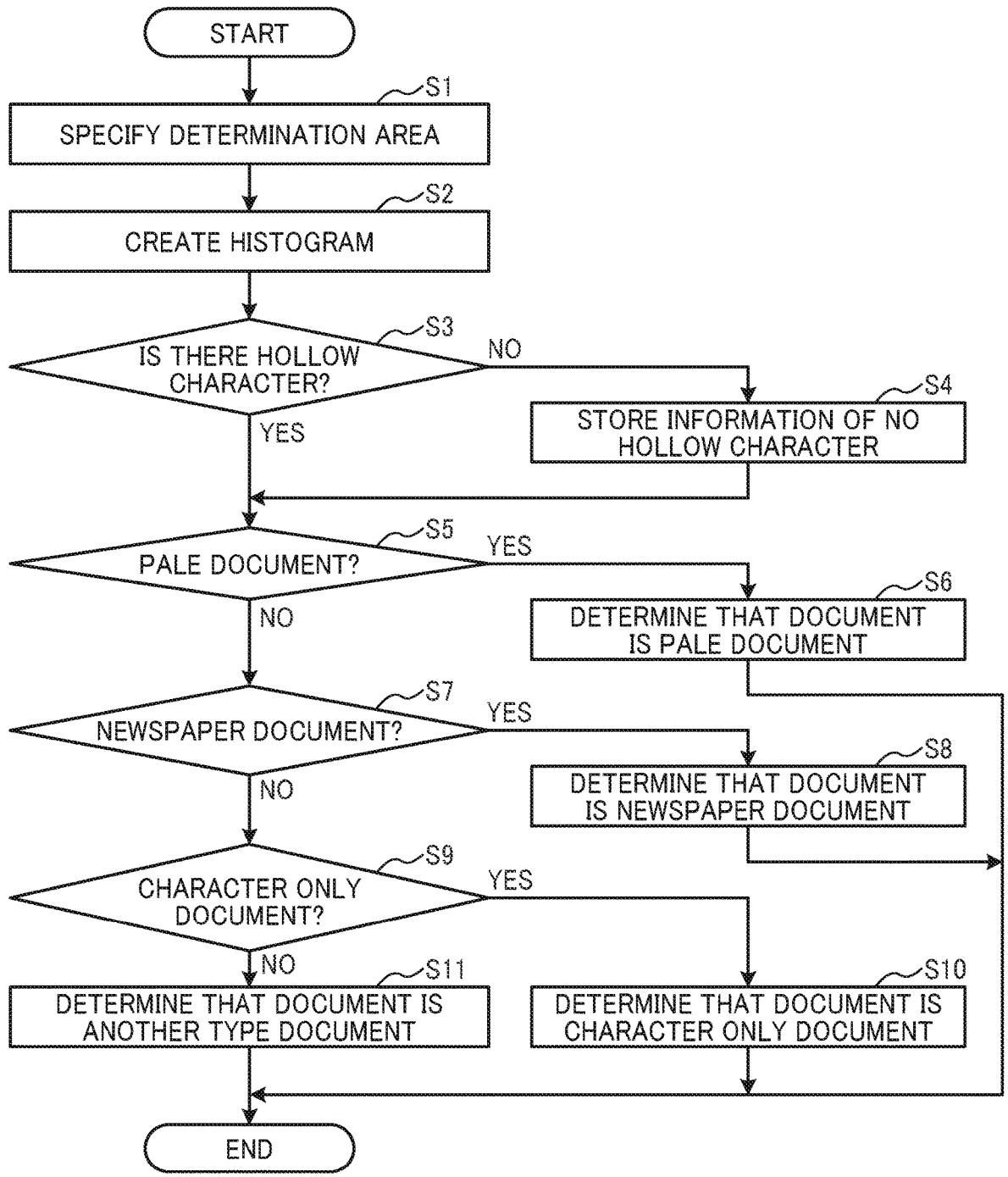
FIG. 5 is a flowchart illustrating an example of processing by a document type determiner.

The document type determiner 18 performs processing to determine a document type on the edge-enhanced image and outputs a determined result. FIG. 5 is a flowchart illustrating an example of processing by the document type determiner 18. Prior to image compression, the document type determiner 18 uses a histogram of pixel values of the edge-enhanced image to determine whether the document type is (1) a character only document, (2) a newspaper document, (3) a pale document, and (4) other documents. The specific content of flow in FIG. 5 is described hereinafter.

Figure 6:
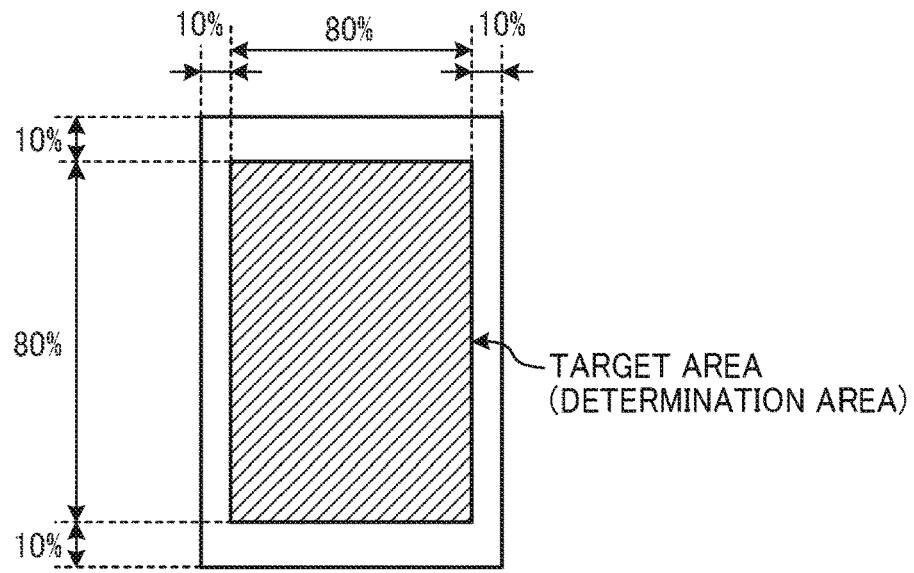
FIG. 6 is a schematic diagram illustrating a determination area on a document to be used for creating a histogram.

First, the document type determiner 18 specifies a target area (a determination area) for creating a histogram of one screen (step S1). There are two areas that are not used for creating the histogram. As illustrated in FIG. 6, one is an area 10% from each of the horizontal and vertical ends of the document. The other is the edge area of the input image Im0. The former eliminates an inclusion of a shadow into the document, while the latter eliminates an inclusion of an intermediate pixel between the character and the background. The shadow of the document and the intermediate pixel between the character and the background can be possibly erroneously determined as a pattern though those are not a pattern, thus being eliminated from the determination area in advance.

Figure 7:
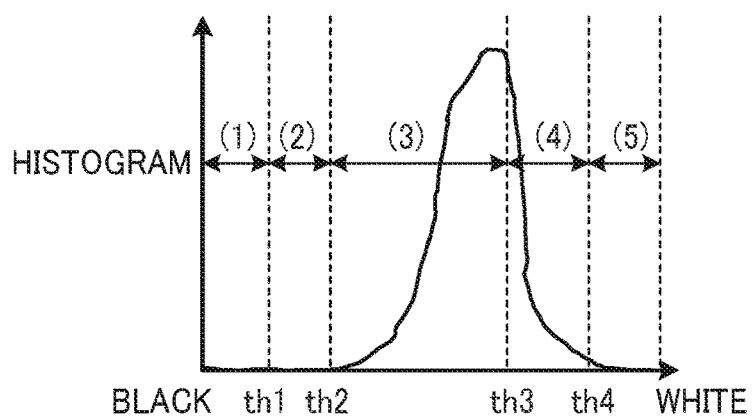
FIG. 7 is a view illustrating an example of creating a histogram.

Next, the document type determiner 18 creates a histogram (step S2). In this case, as illustrated in FIG. 7, the document type determiner 18 makes five ranges of density of the pixel in the determination area by using four thresholds determined by experiments and the like and counts the pixels in each range. The document type determiner 18 creates the histogram and counts a number of the pixels in the five ranges, that is, (1) true black color, (2) black color, (3) neutral color, (4) gray (newspaper ground) color, and (5) white color. Hereinafter, a method for determining each threshold is described.

As a method of determining a threshold th1 between the true black color and the black color, the threshold th1 is set to be lower than a luminance value of the character of the newspaper.

As a method of determining the threshold th2 between the black color and the neutral color, the threshold th2 is set so that the character color of the newspaper is classified to the black color. The threshold th2 is also set so that the character color (particularly black character color) of the character only document is classified to the black color, and a black character of the pale document is classified to the neutral color.

As a method of determining the threshold th3 between the neutral color and the gray color, the threshold th3 is set so that the newspaper ground color is classified to the gray color.

As a method of determining the threshold th4 between the gray color and the white color, the threshold th4 is set so that the newspaper ground color is classified to the gray color, and a white background is classified to the white color. The threshold th4 is also set so that a hollow character is classified to the white color.

With reference to FIG. 5, the document type determiner 18 determines whether there is the hollow character (step S3). The hollow character generally is bolder than black character. The pixel in the hollow character is counted as white color. By utilizing this property, the document type determiner 18 determines whether there is the hollow character based on a number counted as white color in a character region and a predetermined threshold value. When the document type determiner 18 determines there is not the hollow character or white background (NO in step S3), the document type determiner 18 stores information of no hollow character in the storage device such as the hard disk drive (HDD) 104 or the like (step S4). The information of no hollow character is used at the time of detecting the hollow character of the newspaper document, the pale document, or the other documents.

When there is the hollow character or the white background (YES in step S3), the document type determiner 18 determines whether the document type is the pale document (step S5). In the pale document, Neutral color to white color are dominant, whereas true black color and black color are less dominant. By utilizing this property, the document type determiner 18 determines whether the document type is the pale document based on the number of the pixels in each of the five ranges determined by the thresholds. When the document type determiner 18 determines the document is the pale document (YES in step S5), the document type is determined to be the pale document (step S6), and the processing is terminated.

When the document type determiner 18 does not determine the document is the pale document (NO in step S5), the document type determiner 18 determines whether the document type is the newspaper document" (step S7). In the newspaper document, the newspaper ground color (gray) is dominant, whereas the true black color and the neutral colors are less dominant. By utilizing this property, the document type determiner 18 determines whether the document type is the newspaper document based on the number of the pixels in each of the five ranges determined by the thresholds. When the document type determiner 18 determines the document is the newspaper document (YES in step S7), the document type is determined to be the newspaper document (step S8), and the processing is terminated.

When the document type determiner 18 does not determine the document is the newspaper document (NO in step S7), the document type determiner 18 determines whether the document type is the character only document" (step S9). In the character only document, the true black color, the black color, and the white color are dominant, whereas the neutral color and the newspaper background color (gray) less are less dominant. By utilizing this property, the document type determiner 18 determines whether the document type is the newspaper document based on the number of the pixels in each of the five ranges determined by the thresholds. When the document type determiner 18 determines the document is the character only document (YES in step S9), the document type is determined to be the character only document (step S10), and the processing is terminated.

When the document type determiner 18 does not determine the document type is the character only document (NO in step S9), the document type is determined to be other documents (step S11), and the processing is terminated.

The determination result by the document type determiner 18 and the edge-enhanced image described above are input to the second detector 13 illustrated in FIG. 4.

Based on the information input from the document type determiner 18, the second detector 13 detects the line drawing candidate from the edge-enhanced image, and outputs a detected result (hereinafter referred to as "the line drawing candidate detection result"). For example, the processing performed by the second detector 13 is binarizing the edge-enhanced image, extracting connected components of black pixels and white pixels from the binarization image, and detecting the line drawing candidate based on a size of a circumscribed rectangle of the connected components and the like. That is, processing before the extraction of the character line corresponds to an example of the processing performed by the second detector 13. The line drawing candidate detection result is, for example, coordinate data indicating a coordinate position of a pixel group detected as the line drawing candidate by the second detector 13 in the input image Im0. This candidate detection result is input to the calculator 14 and the determiner 15 as the detection result of the detector 10.

Figure 8:
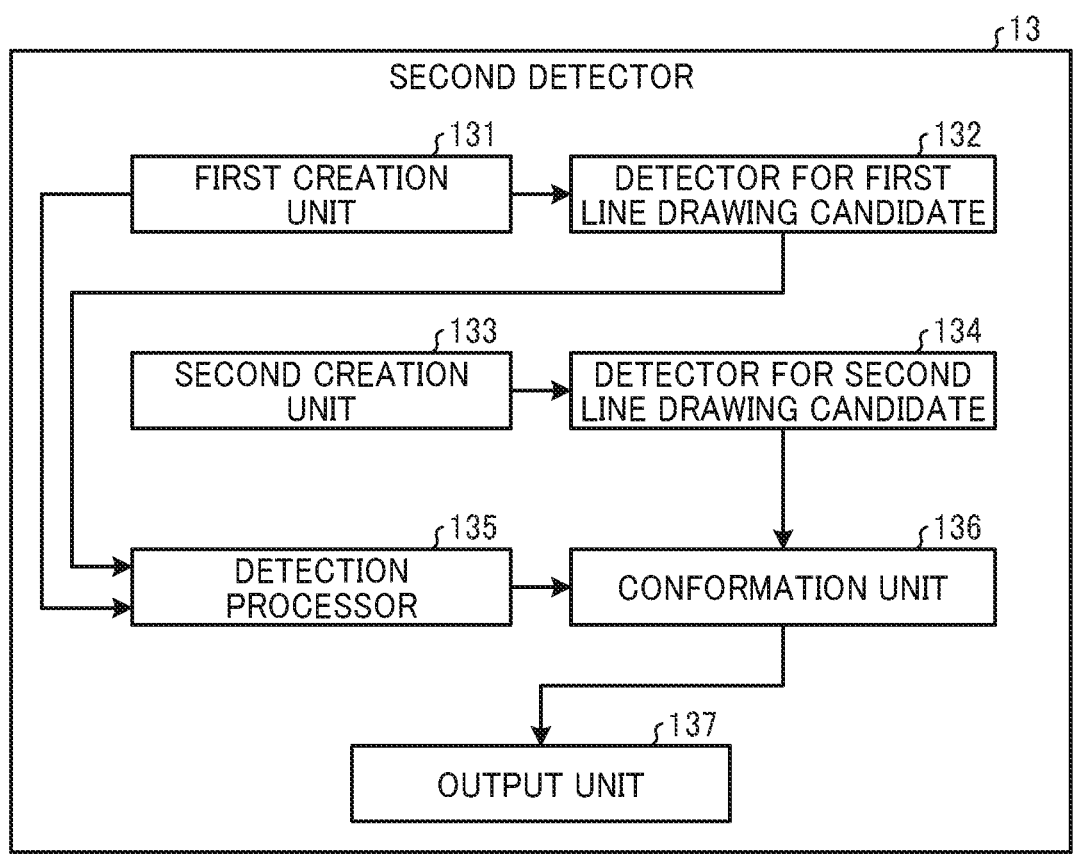
FIG. 8 is a functional block diagram illustrating an example of a second detector.

FIG. 8 is a functional block diagram illustrating an example of a second detector 13. As illustrated in FIG. 8, the second detector 13 includes a first creation unit 131, a detector for a first line drawing candidate 132, a second creation unit 133, a detector for a second line drawing candidate 134, a detection processor 135, a conformation unit 136, and an output unit 137.

The first creation unit 131 binarizes the multi-value image to extract an object with lower luminance than a background and creates a first image. In the present embodiment, the first creation unit 131 binarizes the edge-enhanced image to create the first image. The detector for the first line drawing candidate 132 detects a line drawing candidate (referred to as a first line drawing candidate) from the first image.

The second creation unit 133 binarizes the multi-value image to extract an object with higher luminance than the background and creates a second image. In the present embodiment, the second creation unit 133 binarizes the edge-enhanced image to create the second image. The detector for the second line drawing candidate 134 detects a line drawing candidate (referred to as a second line drawing candidate) from the second image.

The detection processor 135 is an example of a detector, and detects a table that can display a character in each of a plurality of cells delimited by a plurality of ruled lines from the multi-value image. In the present embodiment, the detection processor 135 detects the table based on the first image. Specific detail is described later.

The conformation unit 136 switches a method of conforming color of a constituent element in the table based on information of the element of the table detected by the detection processor 135. Specifically, the conformation unit 136 determines whether to conform the color of the constituent element in the table based on the number of colors of the constituent element in the table.

More specifically, when the number of colors of a ruled line to be processed is one, the conformation unit 136 fills the ruled line with the color of the ruled line to be processed. When the number of colors of the ruled line to be processed is two and one of the two colors corresponds to color of a cell, the conformation unit 136 conforms the color of the ruled line to the other color. When the number of colors of the ruled line to be processed is greater than two, and the colors include a color that does not correspond to the ruled line and the cell, the conformation unit 136 does not change the color of the ruled line to be processed.

In addition, in the present embodiment, the conformation unit 136 determines whether to conform the color of a character based on the number of colors of the character included in the table. Specifically, when the number of colors of the character to be processed is one, the conformation unit 136 fills the character with the color of the character to be processed. When the number of colors of the character to be processed is two, that is, one of the colors corresponds to color of the character, and the other color corresponds to color of the cell, the conformation unit 136 conforms the color of the character to the color corresponding to the character. When the number of colors of the character to be processed is greater than two, and the colors include a color that does not correspond to the character and the cell, the conformation unit 136 does not change the color of the character.

In addition, in the present embodiment, the conformation unit 136 determines whether to conform color of a cell based on a number of color of the cell included in the table. Specifically, when the number of colors of the cell to be processed is one, the conformation unit 136 fills the cell with the color of the cell to be processed. When the number of colors of the cell to be processed is two, the colors are white and color other than white, and their hue difference is within a threshold value, the conformation unit 136 conforms the color of the cell to any one of the two colors.

Further, the conformation unit 136 determines whether to conform the color of the element in the table based on the document type. In the present embodiment, the conformation unit 136 does not conform the color of the element in the table when the document type is the character only document or the newspaper document (a gray newspaper document). Detailed function of the conformation unit 136 is described later. The output unit 137 outputs a final line drawing candidate.

Figure 9:
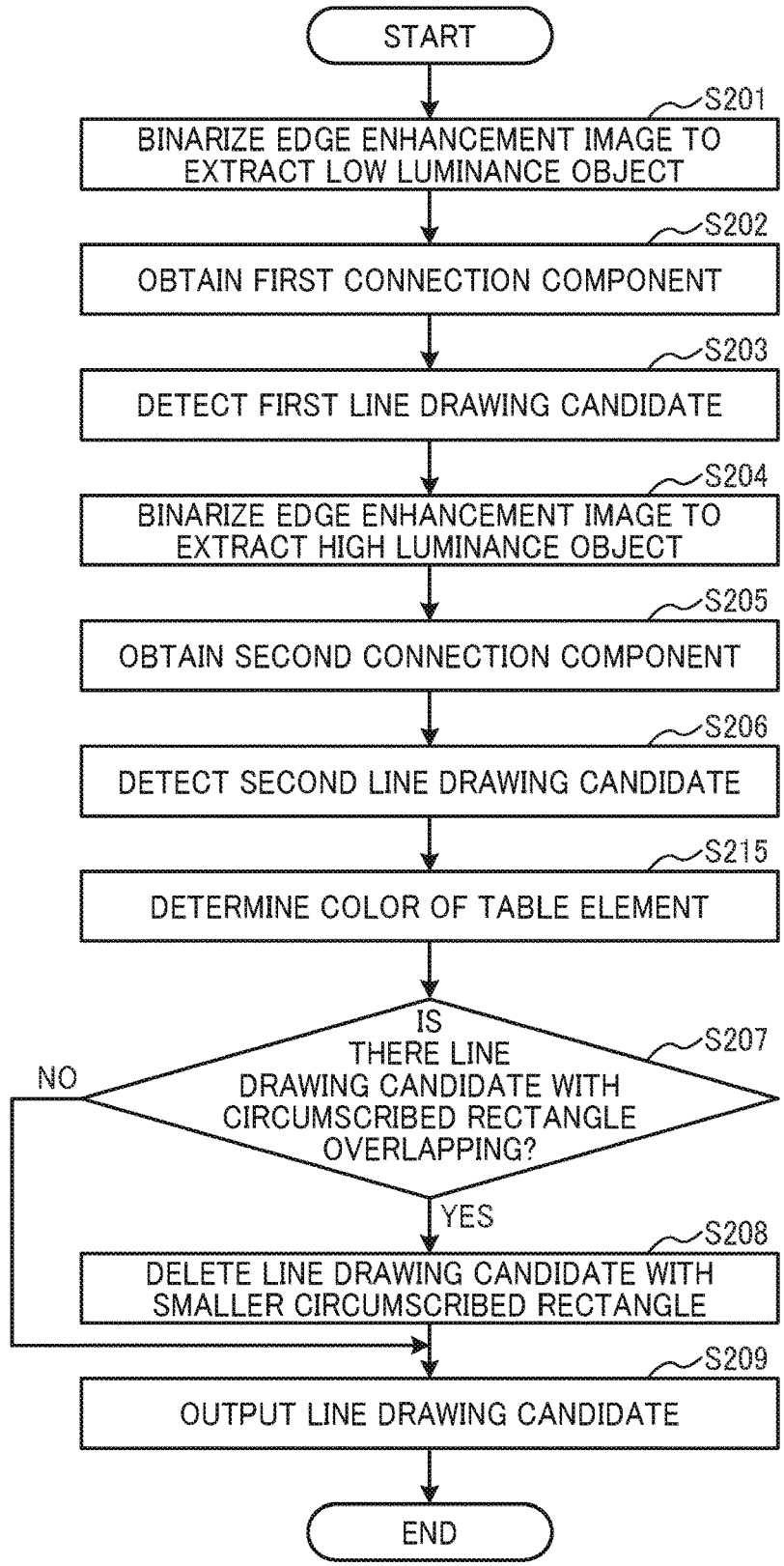
FIG. 9 is a flowchart illustrating an example of processing by the second detector.

FIG. 9 is a flowchart illustrating an example of processing by the second detector 13. The second detector 13 performs the following processes using the edge-enhanced image delivered from the document type determiner 18 and the determination result of the document type. As illustrated in FIG. 9, the first creation unit 131 performs binarization on the edge-enhanced image created by the edge enhancement unit 12 (step S201). As described above, the binarization in step S201 is processing to extract an object with lower luminance than the background. Therefore, a suitable threshold is set to distinguish the low luminance object form the background. The first creation unit 131 may dynamically change the threshold to improve accuracy of separation between the background and the object and perform the binarazation. For example, the first creation unit 131 may switch a binarization method and the threshold based on the document type. In order to enable binarization dedicated to the document type, the first creation unit 131 may switch the binarization method for the document type as follows. For other documents, the first creation unit 131 may perform the binarization method of dynamically changing the threshold. For the pale document, the first creation unit 131 may perform the binarization method of dynamically changing the threshold set high. For the character only document and the newspaper document, the first creation unit 131 may perform the binarization method of using the fixed threshold.

Next, from a first image obtained by the binarization in step S201, the detector for the first line drawing candidate 132 obtains a first connection component in which a run of black pixels aligned in the vertical direction and a run of black pixels aligned in the horizontal direction are connected (step S202). Since the line drawing is mostly occupied in the character only document, the detector for the first line drawing candidate 132 may determine the result of the binarization as the line drawing without calculating the connection component. However, even when the document type determiner 18 determines that the document type is the character only document, when the character has two or more colors or exists on a local color band, the detector for the first line drawing candidate 132 may obtain the first connection component and outputs the first connection component as the line drawing detection result. At this time, when the first connection component includes two or more colors, the detector for the first line drawing candidate 132 may leave only the first connection component with lower luminance and output it as the line drawing detection result.

Next, based on a size of the circumscribed rectangle of the first connection component and a positional relationship of the first connection component, from the first connection component obtained in step S202, the detector for the first line drawing candidate 132 detects, as a first line drawing candidate, the first connection component distinguishable from the pattern (step S203). Since it is known that the newspaper document (the gray newspaper document) is almost configured by characters, the detector for the first line drawing candidate 132 does not detect the line drawing candidate (that is, the detector does not execute the process of step S203). This makes it possible to realize high speed and high image quality. However, the newspaper document may express a pattern with a large halftone dot, which may not be suitably handled by applying a filter. Therefore, it is desirable to perform processing to remove halftone dots. The method of removing the halftone dots may be a method of removing the first connection component having the small circumscribed rectangle or a method of removing the first connection component having the circumscribed rectangle near which there is a similar size circumscribed rectangle. The former is fast and the latter is a way to prevent punctuation marks from disappearing. In addition, because character determination of an image including a small number of halftone dots does not greatly affect a file size, if a number of the connected component having the small circumscribed rectangle is equal to or smaller than a threshold, the detector for the first line drawing candidate 132 may not perform the processing to remove the halftone dots. This prevents degradation of image quality due to disappearance of the punctuation. Because a color newspaper document may include a photograph, a color ground table, or the like, the detector for the first line drawing candidate 132 performs the process of step S203. The color newspaper document is the document determined to be the newspaper document by the document type determiner 18. It is known that the table included in the color newspaper document is configured by black ruled lines and black letters. However, because the table may include the photograph, it is necessary to estimate the color by the method in step S215 described later.

The second creation unit 133 performs binarization on the edge-enhanced image created by the edge enhancement unit 12 (step S204). As described above, the binarization is processing to extract an object with higher luminance than the background. Therefore, a suitable threshold is set to distinguish high luminance object form the background. The second creation unit 133 may dynamically change the threshold to improve accuracy of separation between the background and the object and perform the binarization.

Next, from a second image obtained by the binarization in step S204, a detector for a second line drawing candidate 134 obtains a second connection component in which a run of white pixels aligned in the vertical direction and a run of white pixels aligned in the horizontal direction are connected (step S205). Next, based on a size of the circumscribed rectangle of the second connection component or the like, from the second connection component obtained in step S205, the detector for the second line drawing candidate 134 detects, as a second line drawing candidate, the second connection component distinguishable from the pattern (step S206).

Next, the second detector 13 detects the table based on the first image and determines the color of the element in the detected table (the element includes at least one of the ruled line, the character, and the cell) (step S215). The specific content of step S215 is described later. Since all characters in the gray newspaper document become black characters, the second detector 13 does not perform this step. Since the character only document is determined as the character entirely, and determining the color of the character is easy, the second detector 13 does not perform this step. However, the image processing apparatus may not include the document type determiner 18. In this case, the second detector 13 is inputted the edge-enhanced image, not inputted the determination result of the document type, and performs the steps in FIG. 9 and FIG. 10 irrespective the document type.

Next, the output unit 137 determines whether there is a line drawing candidate in which the circumscribed rectangles overlap among the first line drawing candidate detected in step S203 and the second line drawing candidate detected in step S206 (step S207). If there is the line drawing candidate in which the circumscribed rectangles overlap (YES in step S207), the output unit 137 compares sizes of the circumscribed rectangles of the line drawing candidates and deletes the line drawing candidate having the smaller circumscribed rectangle (step S208). In the gray newspaper document, there is a high possibility that an outline area with higher luminance than the newspaper ground color is the hollow character. Based on the size of the hollow character candidate, the output unit 137 determines the hollow characters and deletes the overlapping connected components. The output unit 137 outputs the line drawing candidate remaining without being deleted in step S208 from the first line drawing candidate and the second line drawing candidate, or the first line drawing candidate and the second line drawing candidate whose color are determined in step S215 as the final line drawing candidate detection result (step S209), and the series of processing is terminated.

Figure 10:
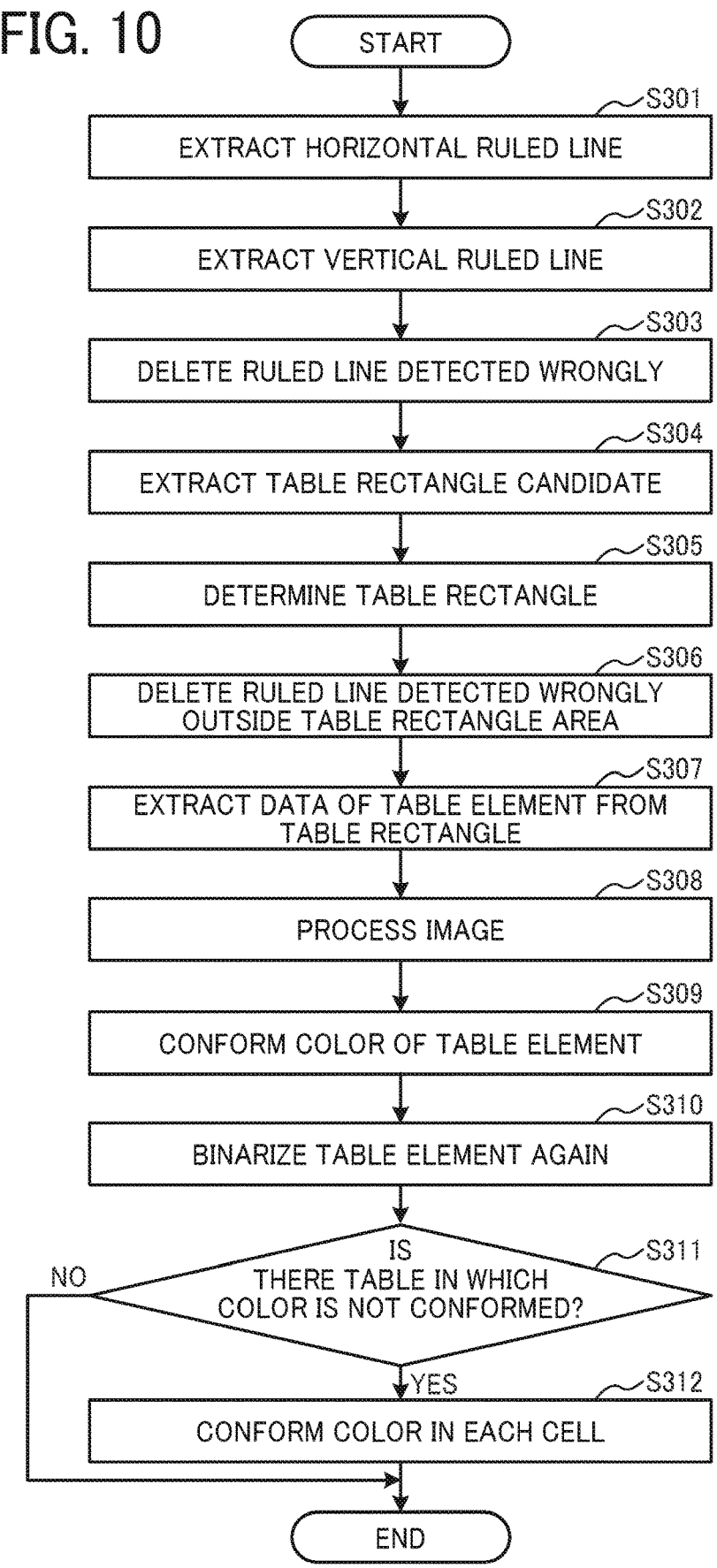
FIG. 10 is a flowchart detailing the process of step S215 in FIG. 9.

FIG. 10 is a flowchart illustrating detailed processes of step S215 in FIG. 9. As illustrated in FIG. 10, the detector for the first line drawing candidate 132 extracts a ruled line candidate that is a group of pixels and may form a horizontal ruled line from the first image obtained in step S201 in FIG. 9. Some methods can be adopted for extracting the ruled line candidate. For example, in one of the methods, the detector for the first line drawing candidate 132 extracts the connected component having a black run (black pixels which are connected continuously in a horizontal or vertical direction) equal to or longer than a predetermined length, and determines elongated one (horizontally long one) as the ruled line candidate based on an aspect ratio of the connected component. In the present embodiment, the detector for the first line drawing candidate 132 extracts the black run equal to or longer than a predetermined length, and determines elongated one (horizontally long one) as a thin ruled line candidate based on the aspect ratio of the black run. Further, the detector for the first line drawing candidate 132 extracts the connected component of the black run having a length equal to or less than a predetermined value, and determines elongated one (horizontally long one) as a thick ruled line candidate based on the aspect ratio of the connected component of the black run. When extracting the ruled line candidate in a black and white reversed table, the detector for the second line drawing candidate 134 extracts the ruled line candidate from the second image obtained in step S204 in FIG. 9. In that case, similar processing can be done by exchanging white and black. For example, the detector for the second line drawing candidate 134 may extract a connected component having a white run as a constituent element, and determines an elongated one as a ruled line candidate based on its aspect ratio. Ruled lines are included in line drawings as a concept.

Next, the detector for the first line drawing candidate 132 extracts a ruled line candidate that is a group of pixels and may form a vertical ruled line from the first image obtained in step S201 in FIG. 9. The processing to extract the horizontal ruled line in step S301 is merely converted to the processing to extract the vertical ruled line. For example, the detector for the first line drawing candidate 132 may extract a connected component having a black run longer than or equal to a predetermined length as a constituent element, and determines an elongated one (vertically long one) as the ruled line candidate based on its aspect ratio. In the present embodiment, the detector for the first line drawing candidate 132 extracts the black run equal to or longer than a predetermined length, and determines elongated one (vertically long one) as a thin ruled line candidate based on the aspect ratio of the black run. Further, the detector for the first line drawing candidate 132 extracts the connected component of the black run having a length equal to or less than a predetermined value, and determines elongated one (vertically long one) as a thick ruled line candidate based on the aspect ratio of the connected component of the black run.

Next, the detector for the first line drawing candidate 132 performs a process of deleting the erroneously detected ruled line candidate (step S303). The specific content thereof is described hereinafter. The detector for the first line drawing candidate 132 extracts a thick ruled line candidate based on a result of extracting the ruled line as a rectangle and the vertical and horizontal sizes of the rectangle. The detector for the first line drawing candidate 132 determines whether the thick ruled line candidate is an oblique ruled line and removes the thick ruled line other than the oblique ruled line from the ruled line candidate. The reason for leaving oblique ruled lines in this step is to prevent not extracting the table in the skewed input image. The reason for deleting a thick ruled line is that the thick ruled line candidate may be an erroneously detected area other than the ruled line such as a solid portion.

With reference to FIG. 11, a method of determining the oblique ruled line is described. An example of the oblique ruled line in FIG. 11 is an example of images illustrated in FIGS. 11A and 11B, which are the vertical ruled lines extracted in step S302. The detector for the first line drawing candidate 132 also performs the same processing on the horizontal ruled line extracted in step S301.

Figure 11C:
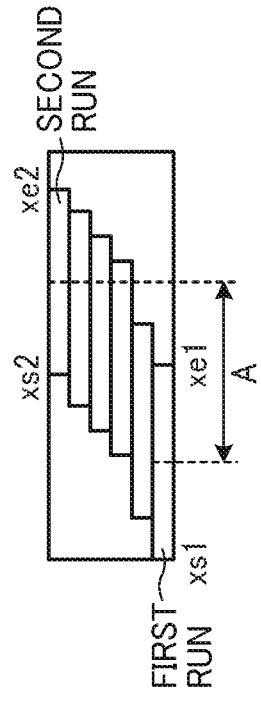
FIG. 11C is an explanatory diagram illustrating primary determination of the diagonal ruled line in FIG. 11A.
Figure 11D:
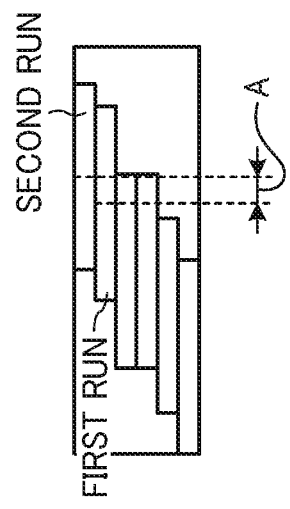
FIG. 11D is an explanatory diagram illustrating primary determination of the diagonal ruled line in FIG. 11B.

First, as illustrated in FIGS. 11C and 11D, the detector for the first line drawing candidate 132 calculates center positions $xc1$ and $xc2$ of runs corresponding to both ends of the ruled line. The detector for the first line drawing candidate 132 calculates the center positions of the runs by the following calculation formula. If there are a plurality of runs on the same horizontal line and both are part of the ruled line, let xs be the leftmost pixel among the plurality of runs and xe the rightmost pixel among the plurality of runs.

A center coordinate of a first run $xc1=(xs1+xe1)/2$

A center coordinate of a second run $xc2=(xs2+xe2)/2$

Further, the detector for the first line drawing candidate 132 calculates a slope A of the ruled line by the following expression.

A slope of the ruled line $A$=the center coordinate of second run $xc2$–the center coordinate of first run $xc1$ When the slope A of the ruled line is greater than zero, the ruled line rises to the right. When the slope A of the ruled line is smaller than zero, the ruled line goes down to the right. When the slope A of the ruled line is zero, the ruled line is a vertical ruled line. In the example of FIGS. 11C and 11D, the detector for the first line drawing candidate 132 firstly determines that the ruled lines rise to the right.

Figure 11E:
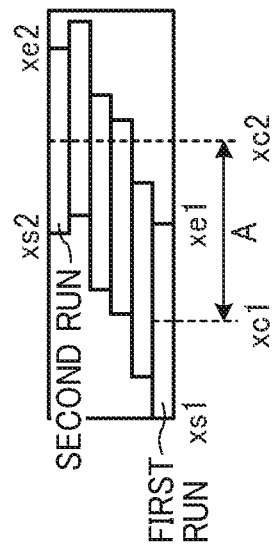
FIG. 11E is an explanatory diagram illustrating an example in which erroneous detection occurs when the diagonal ruled line in FIG. 11A is determined for each run.
Figure 11F:
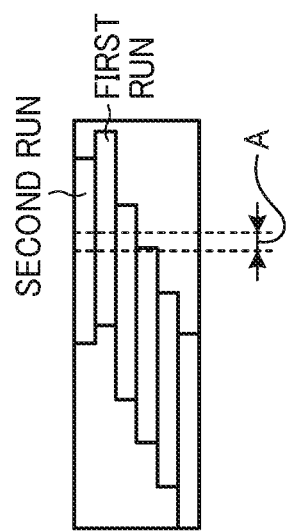
FIG. 11F is an explanatory diagram illustrating an example in which normal detection is performed when the diagonal ruled line in FIG. 11B is determined for each run.

Next, the detector for the first line drawing candidate 132 determines the slope A of the ruled line in adjacent runs. The detector for the first line drawing candidate 132 calculates the above-described slope A for each adjacent run. In FIG. 11E, since the slope A becomes a negative value, the detector for the first line drawing candidate 132 determines that the ruled line goes down to the right. In FIG. 11F, since the slope A becomes a positive value, the detector for the first line drawing candidate 132 determines that the ruled line rise to the right. Since the determination results are different in FIGS. 11C and 11E, the detector for the first line drawing candidate 132 determines that erroneous detection occurs in the ruled line in FIG. 11A. The detector for the first line drawing candidate 132 deletes the ruled line in which the erroneous detection occurs from the ruled line candidate. When the slope A is zero, the detector for the first line drawing candidate 132 moves to this determination (comparison) process between the next adjacent runs. The detector for the first line drawing candidate 132 performs this determination at all runs. If the slopes A of the all determination results are in a same direction as illustrated in FIG. 11F, the detector for the first line drawing candidate 132 determines the ruled line is the oblique ruled line and leaves as the ruled line candidate. Oblique ruled lines whose slopes are close to the vertical often have opposite slopes. Therefore, the detector for the first line drawing candidate 132 may obtain the absolute value of the difference between the slope A of the entire ruled line and the slope A' of the adjacent runs, compare it with a predetermined threshold, and determines the ruled line candidate. The detector for the first line drawing candidate 132 may measure a line width of the ruled line. The detector for the first line drawing candidate 132 may determine that the ruled line with a fine line width has a high probability a that the ruled line is the oblique ruled line.

Returning to FIG. 10, after the above-described step S303, the detection processor 135 executes a rectangle extraction process on the first image obtained in step S201 in FIG. 9 and extracts a table rectangle candidate as a table candidate (step S304). Next, the detection processor 135 counts a number of the horizontal ruled line and the vertical ruled line, respectively, which exist in the table rectangle candidate extracted in step S303. In other words, the detection processor 135 counts the number of ruled lines remaining in step S303. The detection processor 135 determines the table rectangle candidate if the counted number of ruled lines satisfies the following conditions A and B.

The condition A is to satisfy any one of the following two conditions (A-1 and A-2).

(A-1) There are three or more vertical and horizontal ruled lines in the table rectangle candidate.

(A-2) There are two or more of either the vertical ruled line or the horizontal ruled line, and there are four or more of the other.

The condition B is to satisfy all of the following three conditions (B-1 to B-3).

(B-1) The table rectangle candidate is not too large (for example, less than 95% of the image size).

An intention of the above condition (B-1) is to remove an edge of the document from the table rectangle candidate because a rectangle enclosing most of the input image may be the edge of the document.

(B-2) When the vertical width or the horizontal width of the table rectangle candidate is large (for example, 800 pixels or more), there are three or more vertical and horizontal ruled lines in the table rectangle candidate.

The intention of the above condition (B-2) is that the table rectangle candidate not satisfying the above condition (B-2) is an enclosing frame and not the table, therefore excluded.

(B-3) When the longitudinal width or the lateral width of the table rectangle candidate is large (for example, 800 pixels or more), a density within the table rectangle candidate that is expressed by a width of the table rectangle candidate/a number of ruled lines in the table rectangle candidate is dense (for example, 300 pixels/line or less).

An intention of the above condition (B-3) is to remove a table including a pattern because the table rectangle candidate that does not satisfy the above condition (B-3) tends to be the table including the pattern.

When extracting a table rectangle candidate that is black-and-white reversed, the detection processor 135 can perform processing similar to the above processing using the second image obtained in step S204 in FIG. 9 and extract the table rectangle candidate.

Figure 12A:
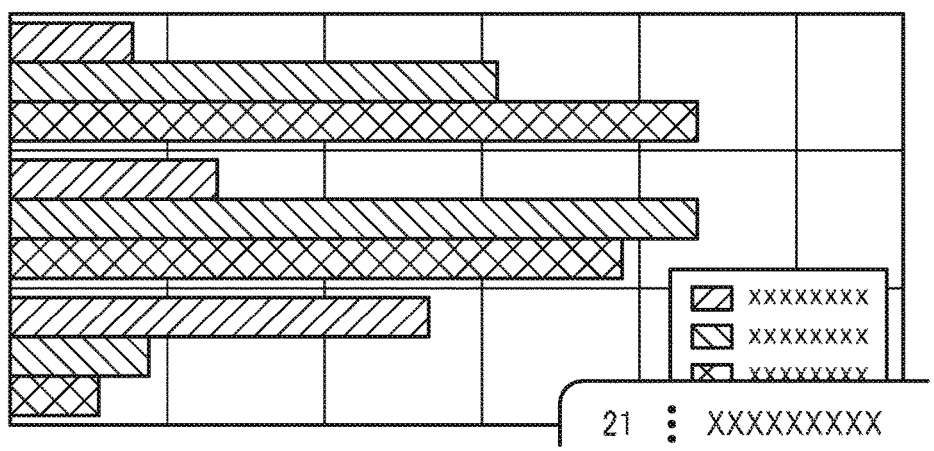
FIG. 12A is a diagram illustrating an example of an input image in which a binarization failure incorrectly determines a solid image as a thick ruled line.
Figure 12B:
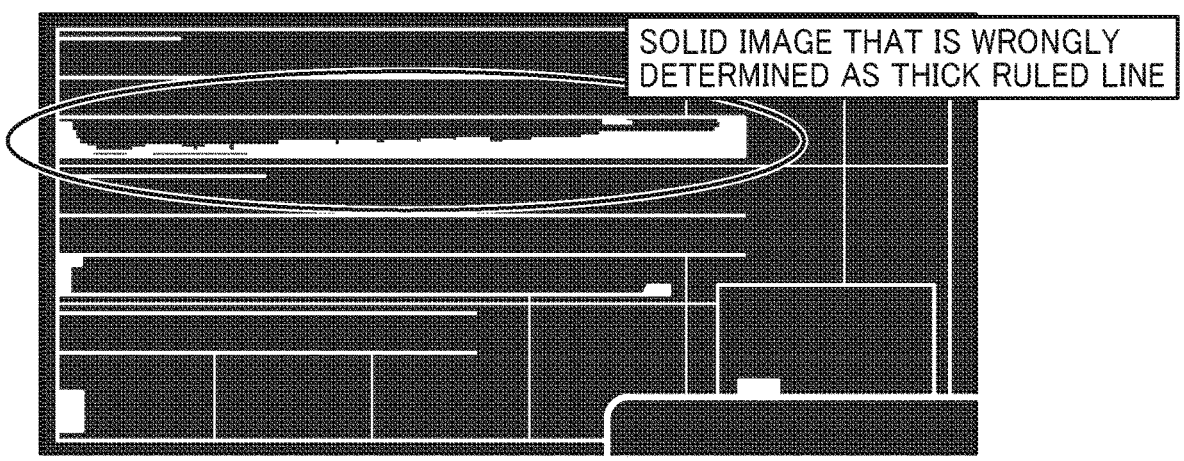
FIG. 12B is an example of a diagram obtained by binarizing the input image in FIG. 12A.

Next, the detection processor 135 determines a table rectangle (hereinafter sometimes simply referred to as "table") from the table rectangle candidate extracted in step S304 (step S305). The result of step S304 includes a case where the failure of binarization causes an erroneous determination with a solid image as the table, for example, which is illustrated in FIGS. 12A and 12B. In this case, the same processing as the table significantly deteriorates image quality. Therefore, the detection processor 135 determines the solid image, executes a process of determining that the solid image portion is not a character, and takes a countermeasure against the above image quality degradation. As a method of determining the solid image, the detection processor 135 may determine that an image portion satisfying the following condition is the solid image.

(Condition) An area of the ruled line with respect to an area of the table rectangle is a predetermined ratio or more (for example, 40% or more).

Using data in the table rectangle, the detection processor 135 can determine that the solid image portion is not a character and exclude the solid image portion from the table rectangle. In this step, the table rectangle is determined. In the pale document, the binarization processing is difficult and a number of portions determined as the solid image portion is easy to increase. Therefore, the threshold of the area ratio described above may be set smaller. In other words, the solid image portion may not be easily determined. For example, the threshold of the area ratio described above may be set to 30% or more. In the black and white reversed table, a determination with a white solid portion as the table does not cause the above problem even if the white solid portion is turned to be white. Therefore, for the above condition, a condition such as "existing a pixel including color other than white" may be added.

After step S305, using the ruled line candidate remaining in step S303 and the table rectangle determined in step S305, the detection processor 135 deletes a ruled line candidate erroneously detected outside the table rectangle (in some cases of the following description, referred to an erroneously detected ruled line) (step S306). Specifically, the detection processor 135 extracts the ruled line candidate (in-table ruled line) included in the table rectangle determined in step S305 and a thick ruled line candidate outside the table rectangle. The detection processor 135 reevaluates whether the thick ruled line candidate is a wrongly detected ruled line. In this step, the reason why the thick rule ruled line candidate outside the table rectangle are detected and deleted is that the possibility of erroneously determining the solid image portion as the ruled line remains. Since an erroneous ruled lines existing in the table rectangle is deleted in a later step, in this step, an erroneous ruled line outside the table rectangle is deleted using the table rectangle data. In this step, the condition for deleting the erroneous ruled line is the following three conditions.

(Condition 1) The erroneously detected ruled line must exist outside the table rectangle.

(Condition 2) The erroneously detected ruled line is a thick ruled line candidate (for example, the ruled line candidate having a thickness of 8 pixels or more).

(Condition 3) The provability a of the oblique ruled line is low (for example, the erroneously detected ruled line should have its line width of five pixels or more).

Next, the detection processor 135 extracts data of the element of the table for each table rectangle (step S307). Specifically, the detection processor 135 calculates a number of the ruled line color, the cell color, and the character color of the table for each table rectangle. In the present embodiment, the detection processor 135 uses the ruled line existing in the table rectangle and the number of colors in the table rectangle calculated from the line drawing candidate (the first line drawing candidate) obtained in step S203 and the table area to calculate the number of colors. When calculating the number of colors increase a calculation amount, the detection processor 135 may classify the colors as (1) one chromatic color, (2) one black color, (3) one white color, (4) one achromatic color other than black and white, and (5) two or more colors. However, the ruled line candidate extracted from the first image obtained in step S201 that is a binary image to extract the low luminance object does not become white. Therefore, in this case, the character does not also become white. The detection processor 135 may use the line drawing candidate obtained in step S203, that is, the first line drawing candidate to calculate the number of the character color. When the detection processor 135 executes detection in the black and white reversed table, the detection processor 135 can use the second image obtained in step S204 that is a binary image to extract the high luminance object and the line drawing candidate obtained in step S206 (that is, the second line drawing candidate) to calculate the data of the constituent elements of the table. When calculating the number of colors, the detection processor 135 uses a number of gradations of the pixel inside the character or the line drawing. The detection processor 135 does not use the edge portion. In the case of a thin ruled line or character that have only the edge portion, the detection processor 135 uses a gradation value of the pixel with the lowest luminance in 3×3 pixels.

Next, the detection processor 135 processes the second image that is the binary image to extract the high luminance object (step S308). Specifically, when the data of the constituent elements in the table rectangle corresponds to any one of the following three conditions, the detection processor 135 deletes a portion overlapping the table rectangle area in the second line drawing candidate that is the line drawing included in the second image obtained in step S204, that is, the binary image to extract the high luminance object.

(Condition 1) Each number of the ruled line color, the cell color, and the character color is one.

(Condition 2) The ruled line color and the character color are black and their number is one.

(Condition 3) The cell color is white and its number is one.

When the detection processor 135 detects the table based on the first image and the elements in the table satisfies one or more predetermined conditions, the detection processor 135 deletes the line drawing overlapping with the table area among in the line drawing included in the second image. The predetermined condition is any one of the number of ruled lines, cells, and characters included in the table is one; that the ruled line and character is black and their number is one; and that the cell is white and its number is one.

This step S308 in FIG. 10 can be realized because character extraction of high-compression PDF is aimed at compression only. For example, the above described processing deletes a high luminance character in a low luminance cell. The character extraction result in this case is not used for an Optical Character Recognition (OCR), since handling the cell and the character similarly prevents recognition of the character. However, under the above conditions, even if high-compression PDF erroneously determines a cell as a character or a character as a cell in the table area, the shape of the character is maintained and there is almost no influence on the file size. However, mixing determination result with cell as character and determination result with cell correctly as cell causes an abnormal image in the high-compression PDF and greatly deteriorates the image quality. (conversely OCR does not matter).

When the detection processor 135 uses a black and white reversed table, if the following condition is satisfied, the detection processor 135 deletes a portion overlapping with the table rectangle area out of the line drawing (the first line drawing) included in the first image created in step S201 that is the binary image to extract the low luminance object.

(Condition 1) The ruled line color and the character color are white and their number is one.

When the detection processor 135 detects the table based on the second image and the element in the table satisfies the predetermined condition, the detection processor 135 deletes the line drawing a portion overlapping with the table area among in the line drawing included in the first image. The predetermined condition is that the ruled line color and the character color are white and their number is one.

Figure 13A:
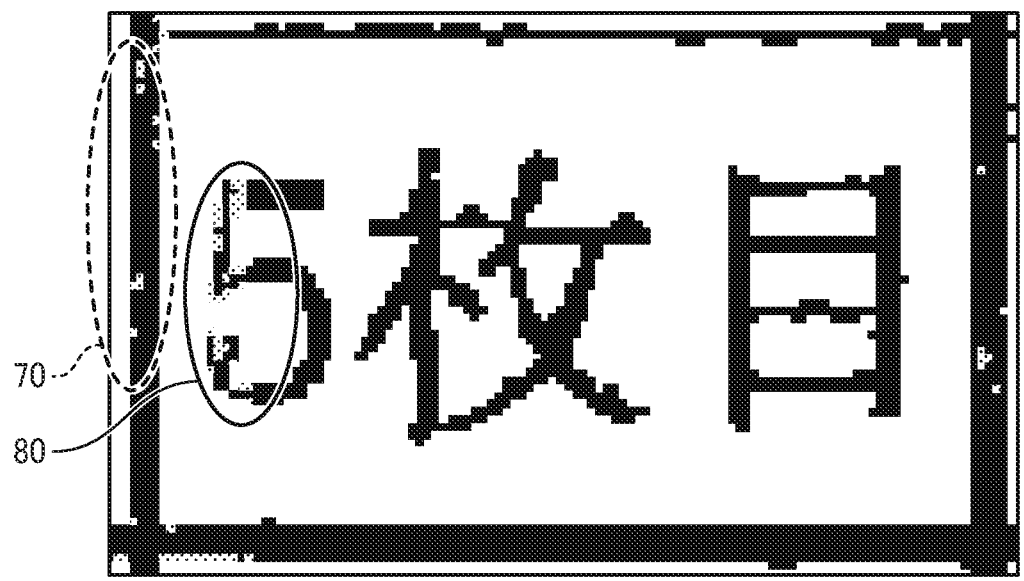
FIG. 13A is a diagram illustrating a result of performing the conformation of a ruled line color and a character color using background art different from the present embodiment.
Figure 13B:
FIG. 13B is a diagram illustrating a result of performing the conformation of the ruled line color and the character color using an embodiment of the present disclosure.

After step S308, the conformation unit 136 performs a process of conforming the colors of the elements in the table (step S309). Conforming the ruled line color and the character color on a table unit basis makes the image quality higher than conforming colors on a line-by-line basis. However, because simply conforming the colors on the table unit basis causes a change in color, the conformation unit 136 conforms the ruled line colors and the character colors according to the following conditions. FIG. 13A is a diagram illustrating a result of performing the conformation of the ruled line color and the character color by a background art different from the present embodiment. FIG. 13B is a diagram illustrating a result of performing the conformation of the ruled line color and the character color by the present embodiment. FIGS. 13A and 13B illustrate an example of a comparison of results of conformation. The ruled line 71 in which its color is conformed by the present embodiment is excellent in uniformity than the ruled line 70 in which its color is conformed by the background art. Similarly, the character 81 in which its color is conformed by the present embodiment is excellent in uniformity than the character 80 in which its color is conformed by the background art.

(Condition 1) Each number of the ruled line color, the cell color, and the character color in the table rectangle is one.

(Condition 2) A sum of the number of ruled line colors, cell colors, and character colors in the table rectangle is two. This is the condition assuming a case where the cell color overlaps with the ruled line the character.

(Condition 3) The ruled line color and the character color in the table rectangle are black.

(Condition 4) The ruled line color and the character color in the table rectangle are white.

Conformation of ruled line colors is carried out by the method described in (A) to (E) below.

(A) The conformation unit 136 focuses on one of the ruled lines (horizontal ruled lines or vertical ruled lines) existing in the table after step S306 (hereinafter referred to as a focused ruled line) and measures the number of colors in the focused ruled line again.

(B) When the result of measuring the number of colors is one color, the conformation unit 136 fills the focused ruled line in the one color.

(C) When the result of measuring the number of colors is two colors, and the two colors are the ruled line color and the cell color, the conformation unit 136 fills the focused ruled line in the ruled line color.

(D) When the result of measuring the number of colors is two or more colors and a color other than the ruled line color and the cell color exist, the conformation unit 136 does not change the color of the focused ruled line.

(E) The conformation unit 136 executes processing of (A) to (D) for all the ruled lines in the table.

In addition, conformation of character color is carried out by the method described in (F) to (J) below.

(F) The conformation unit 136 focuses on one of the characters existing in the table extracted in step S307 (hereinafter referred to as a focused character) and measures the number of colors in the focused character again.

(G) When the result of measuring the number of colors is one color, the conformation unit 136 fills the focused character in the one color.

(H) When the result of measuring the number of colors is two colors, and the two colors are the character color and the cell color, the conformation unit 136 fills the focused character in the character color.

(I) When the result of measuring the number of colors is two or more colors and a color other than the character color and the cell color exist, the conformation unit 136 does not change the color of the focused character.

(J) The conformation unit 136 executes processing of (F) to (I) for all the characters in the table.

When the ruled line color and the character color in the table rectangle are monochrome with black or white, the conformation unit 136 performs the same processing as when the result of measuring the number of colors is one color. At this time, the conformation unit 136 may fill the ruled line or the character with black or white without counting the number of colors.

When the ruled line and the character are each one color (B and G), or when the ruled line and the character are two colors including the cell color (C and H), the same color may be used for the character color and the ruled line color because using the same color facilitates reading the table. Therefore, the conformation unit 136 determines whether each of an absolute value of the difference between a hue of the character color and the ruled line color and an absolute value of the difference between a luminance of the character color and the ruled line color is less than a threshold value. If both of them are equal to or less than the threshold values, the conformation unit 136 determines the ruled line color as the same color as the character color, and conforms their colors. When the conformation unit 136 determines that the ruled line color and the character color are same, the conformation unit 136 determines whether to use the ruled line color or the character color. For example, the conformation unit 136 may determine the ruled line color and the character color by the following procedure.

(A) Due to the characteristics of the scanner, because the edge becomes blunt and do not become a correct color, the conformation unit 136 excludes the edge portion of the ruled line and the character that have the same color.

(B) The conformation unit 136 measures a number of pixels and average color of each of the remaining ruled line pixels and character pixels, and adopt the average color with the larger number of pixels as the ruled line color and the character color.

This procedure conforms a part of the ruled line color and the character color in the table rectangle area and can realize high image quality. Even when the character or the ruled line is thin, because this procedure uses a stable color inside the ruled line or the character other than the edge portion, this procedure decreases the change in color compared with the procedure of conforming the color of the character and the ruled line separately.

Since the character on the color newspaper document is the character on the colored background, the character color tends to be complicated. However, ruled lines and characters in color newspaper documents often use black. Using this, the conformation unit 136 may conform the colors of ruled lines and characters in the color newspaper document as follows. The conformation unit 136 measures color difference and luminance values other than edge portions of characters and ruled lines, determines whether each of the both are equal to or less than a threshold (for example, color difference is 30 or less, and luminance Value is 60 or less), and sets the ruled line and the character to black when the both are equal to or less than the thresholds. The conformation unit 136 may perform color conformation in the table with respect to remaining characters and ruled lines other than the above.

The conformation of the cell color is carried out as follows. The processing for conforming the cell color may not be performed. Conforming the cell color on the table unit basis makes the image quality higher than conforming colors on a cell basis. However, because simply conforming the colors on the table basis causes the change in color, the conformation unit 136 conforms the cell colors according to the following conditions.

(Condition 1) The cell color is one color.

(Condition 2) A hue difference between the cell color and white is within a predetermined threshold value.

(Condition 3) The cell color is two or more colors and does not include white.

In Condition 1, the conformation unit 136 conforms the cell color in one color as long as the hue difference is within a predetermined threshold. In Condition 2, the conformation unit 136 determines whether the hue difference between the cell color and white is within a predetermined threshold. The conformation unit 136 conforms the cell color whose hue difference from white is within the threshold value to white. In Condition 3, the conformation unit 136 calculates an average value for each of a plurality of colors in each cell, and estimates hue values of the plurality of cell colors. Subsequently, the conformation unit 136 determines whether the calculated average values are all within the threshold value. When the calculated average values are all within the threshold value, the conformation unit 136 conforms the cell color to the color having the hue of the median value of the calculated plural average values. However, the conformation unit 136 may not conform the cell colors because a calculation amount is large.

When the conformation unit 136 determines the cell color in this step S309, if the cell color is not white but a low luminance color, there is a possibility that the binarization in step S201 does not correctly extract a character shape. Therefore, in the next step S310, the conformation unit 136 instructs the first creation unit 131 to perform binarization again when the luminance of the cell color is equal to or less than a predetermined threshold and the cell color is one color. This makes it possible to extract the correct character shape. In the case of the black and white reversed table, since the low luminance part and the high luminance part are exchanged, the conformation unit 136 instructs the second creation unit 133 to perform binarization again.

When there is a table in which colors are not conformed in the table unit basis in step S309 (YES in step S311), the conformation unit 136 performs processing of conforming colors on the cell basis (step S312).

Conformation of colors on the cell basis can be realized, for example, by the following method. The conformation unit 136 divides the table rectangle area by horizontal ruled lines and vertical ruled lines. Next, the conformation unit 136 performs the rectangle extraction processing on the divided regions. Specifically, the conformation unit 136 extracts a rectangle having a vertical width and a horizontal width equal to or larger than a threshold (for example, 30 pixels) and a vertical width and a horizontal width equal to or less than a threshold (for example, 300 pixels) as a cell candidate rectangle. Next, the conformation unit 136 extracts a character in the table (hereinafter refers to as a table character) based on the line drawing candidate detected in step S203 and the cell candidate rectangle. Next, the conformation unit 136 sets a focused cell and determines whether there is another character near the table character in the focused cell, that is, whether a distance between the another character and the table character is within a width or a vertical width of the table character. When the conformation unit 136 determines there is another character near the table character in the focused cell, the conformation unit 136 registers a line. Next, the conformation unit 136 determines whether to conform the character colors of the registered line, and carries out conformation of the character colors. The determination method is the same as the above-described method. In step S309, when the conformation unit 136 conforms the ruled line color in the table rectangle area but cannot conform the character color, the conformation unit 136 can use data of the ruled line color. For example, when the ruled line color is one color, there is a high possibility that the same color is also used for the character color. Therefore, when the conformation unit 136 conforms the character color, and when an absolute value of a calculated hue difference between the ruled line color and the calculated character color and an absolute value of a calculated luminance difference between the ruled line color and the calculated character color each are equal to or smaller than a predetermined threshold, the conformation unit 136 may use the ruled line color as the character color. This procedure conforms a part of the ruled line color and the character color in the table rectangle area and can realize high image quality. When the ruled line color is two colors, the conformation unit 136 compares the absolute value of the calculated hue difference between the character color and each of the two ruled line colors, the absolute value of the calculated luminance difference between the character color and each of the two ruled line colors, and predetermined thresholds. Based on the comparison, the conformation unit 136 can conform the character color.

The above is the specific processing content of step S215 in FIG. 9.

Figure 14:
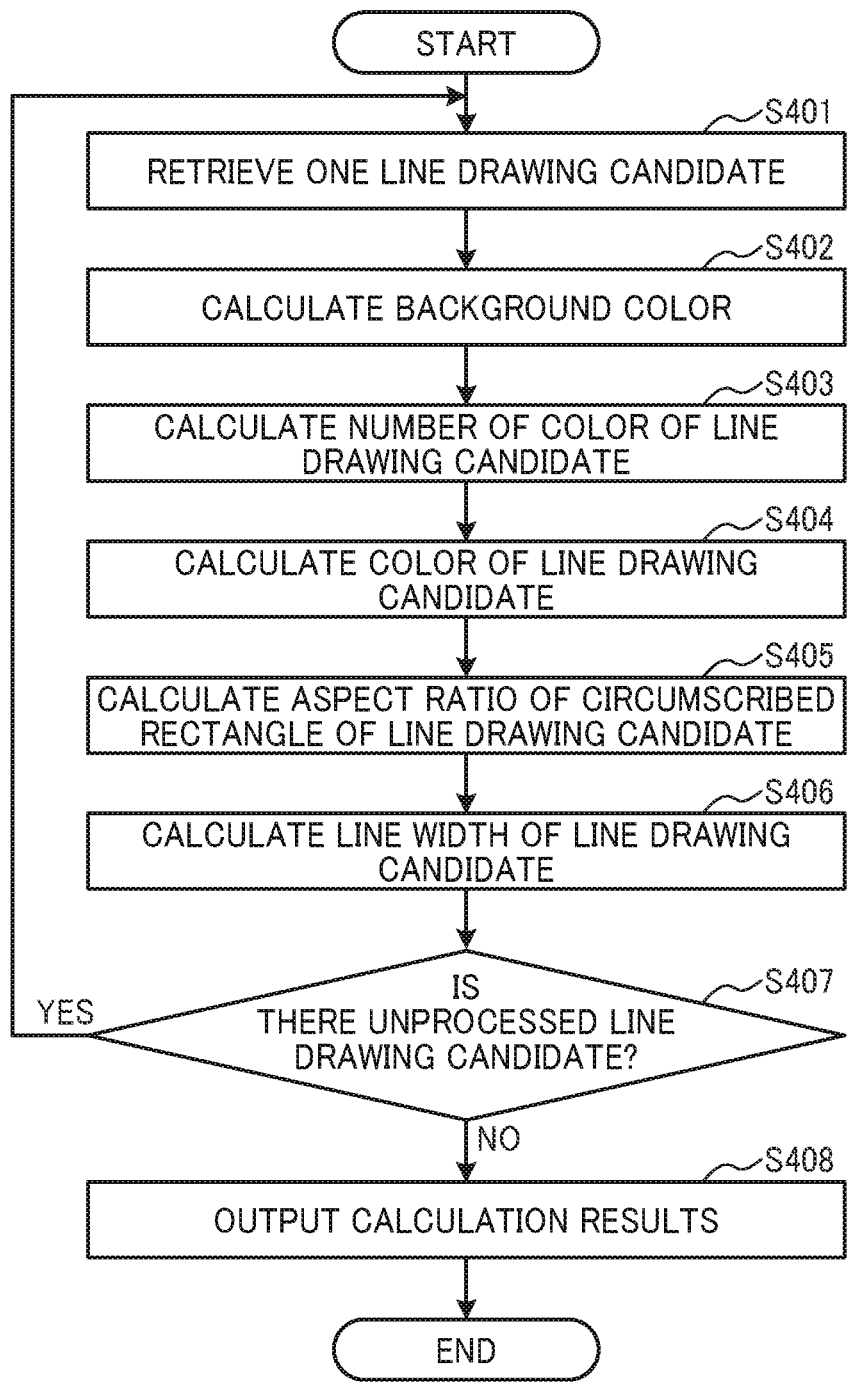
FIG. 14 is a flowchart illustrating an example of processing by a calculator.

FIG. 14 is a flowchart illustrating an example of processing by the calculator 14. In the present embodiment, when the document type is the character only document or the newspaper document, the calculator 14 does not process the detection result of the second detector 13. In addition, the calculator 14 does not perform processing on the area where the second detector 13 determines the color of the element such as the ruled line color, the character color, or the like using the data of the element in the table. In the present embodiment, when the document type is other documents or the pale document, the calculator 14 performs the processing illustrated in FIG. 14 on the area where the second detector 13 does not determine the color of the element using the data of the elements in the table.

As illustrated in FIG. 14, the calculator 14 extracts one of the line drawing candidates included in the input image Im0 to be processed based on the candidate detection result received from the detector 10 (step S401).

Next, the calculator 14 selects an area having a predetermined size and a predetermined shape adjacent to the line drawing candidate extracted in step S401. There may be a gap of about one pixel between the adjacent area and the line drawing candidate. The calculator 14 converts the RGB data of each pixel in the selected area into HSV data and calculates the average value of the HSV data of each pixel converted from the RGB data as the background color of the line drawing candidate Step S402.

Next, the calculator 14 converts the RGB data of each pixel forming the line drawing candidate extracted in step S401 into HSV data, and calculates the number of color of the line drawing candidate, using the HSV data of each pixel converted from the RGB data by, for example, the above described method (step S403). Further, the calculator 14 calculates the color of the line drawing candidate, using the HSV data of each pixel forming the line drawing candidate by, for example, the above described method (step S404). At this time, the calculator 14 may calculate color number and color of the line drawing candidate excluding pixels of the line drawing candidate having color that is close to the background color calculated in step S402 from pixels of the line drawing candidate. For example, the calculator 14 may exclude a pixel having the Euclidean distance in the HSV color space within a predetermined value from the background color and calculate color number and color of the line drawing candidate.

Next, the calculator 14 obtains the circumscribed rectangle of the line drawing candidate extracted in step S401, counts a number of pixels aligned in the vertical direction of the circumscribed rectangle and a number of pixels aligned in the horizontal direction of the circumscribed rectangle, and calculates the aspect ratio of the circumscribed rectangle of the line drawing candidate (step S405). Subsequently, the calculator 14 calculates a line width of the line drawing candidate based on a distance (that is, a number of pixels) between edges of the line drawing candidate extracted in step S401 (step S406).

Next, the calculator 14 determines whether there is an unprocessed line drawing candidate (step S407). When there is an unprocessed line drawing candidate (YES in step S407), the calculator 14 returns to step S401 and repeats the subsequent processing. On the other hand, when the processing is completed for all the line drawing candidates (NO in step S407), the calculator 14 outputs the calculation results of steps S402 to S406 for each line drawing candidate (step S408) and terminates the processing.

Figure 15:
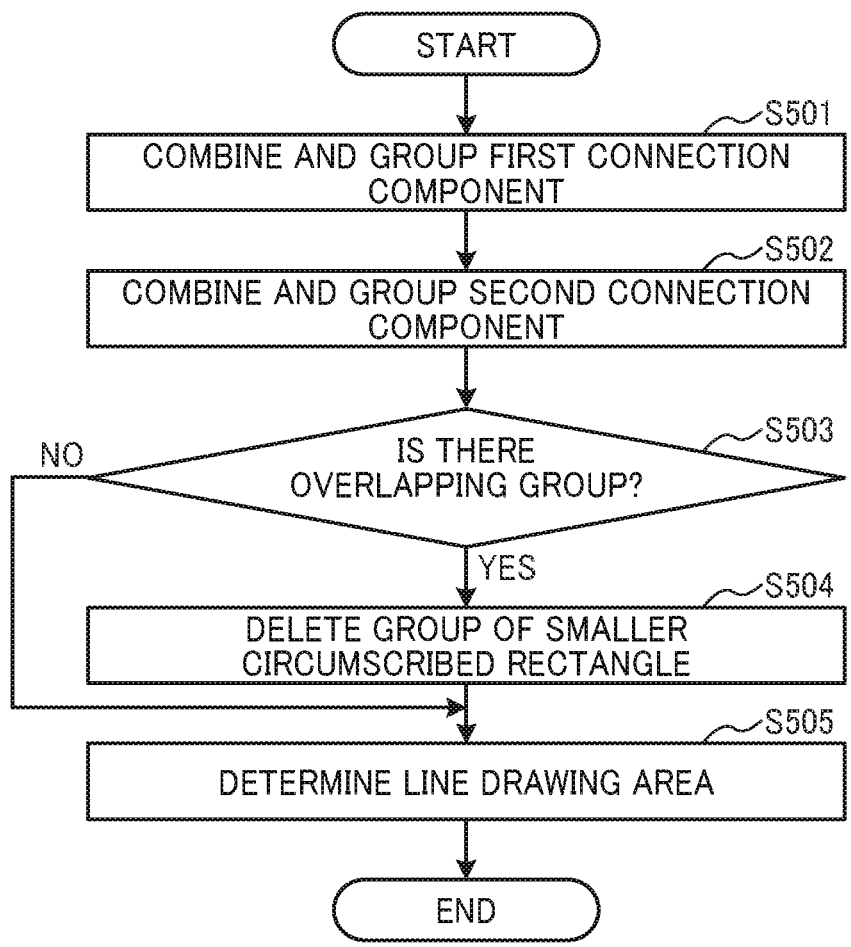
FIG. 15 is a flowchart illustrating an example of processing by a determiner.

FIG. 15 is a flowchart illustrating an example of processing by the determiner 15. Processing by the determiner 15 is processing for grouping the connected components based on the size and positional relationship of the circumscribed rectangle of the connected components and detecting the area of the line drawing included in the group. As described above, the connected component is obtained by the detectors and the units in the second detector 13 as follows. The edge enhancement unit 12 creates the edge-enhanced image. The second detector 13 receives the edge-enhanced image. In the second detector 13, the first creation unit 131 and the second creation unit 133 binarize the edge-enhanced image, and the detector for the first line drawing candidate 132 and the detector for the second line drawing candidate 134 extract the connected components of black pixels and white pixels from the binarized image. In this embodiment, when the document type is the character only document or the newspaper document, the determiner 15 does not perform the processing on the detection result of the second detector 13. In addition, the determiner 15 does not perform the processing on the area where the second detector 13 determines the color of the element in the table by using the data of the element in the table. The determiner 15 determines the area where the second detector 13 determines the color of the element in the table by using the data of the element in the table, which is the area of the line drawing candidate, as a line drawing area (line drawing data) without processing. When the document type is the other documents or the pale document, the determiner 15 executes the processing illustrated in FIG. 15 on the area where the second detector 13 does not determine the color of the element in the table by using the data of the element in the table.

As illustrated in FIG. 15, the determiner 15 combines the above described first connection component based on the size, positional relationship, and the like of the circumscribed rectangle of the first connection component and groups the first connection component (step S501). The determiner 15 groups the first connection component according to a predetermined rule, such as grouping characters, which are representative line drawings, on a line-by-line basis. Therefore, there are first connection components that are not grouped. In addition, the determiner 15 combines the above described second connection component based on the size, positional relationship, and the like of the circumscribed rectangle of the second connection component and groups the second connection component (step S502). The determiner groups the second connection component according to a predetermined rule, such as grouping characters, which are representative line drawings, on a line-by-line basis. Therefore, there are second connection components that are not grouped.

Next, the determiner 15 checks whether there are groups overlapping in position in the edge-enhanced image among the group obtained in step S501 and the group obtained in step S502 (step S503). When there are overlapping groups (YES in step S503), the determiner 15 compares the sizes of circumscribed rectangles of the groups and deletes the group having the smaller size (step S504). The determiner 15 determines the area of the connected component included in the group obtained as described above as the line drawing area (line drawing data) included in the input image Im0 (step S505). The line drawing data determined by the determiner 15 is input to the compression processing unit 16 that is the subsequent unit.

Figure 16:
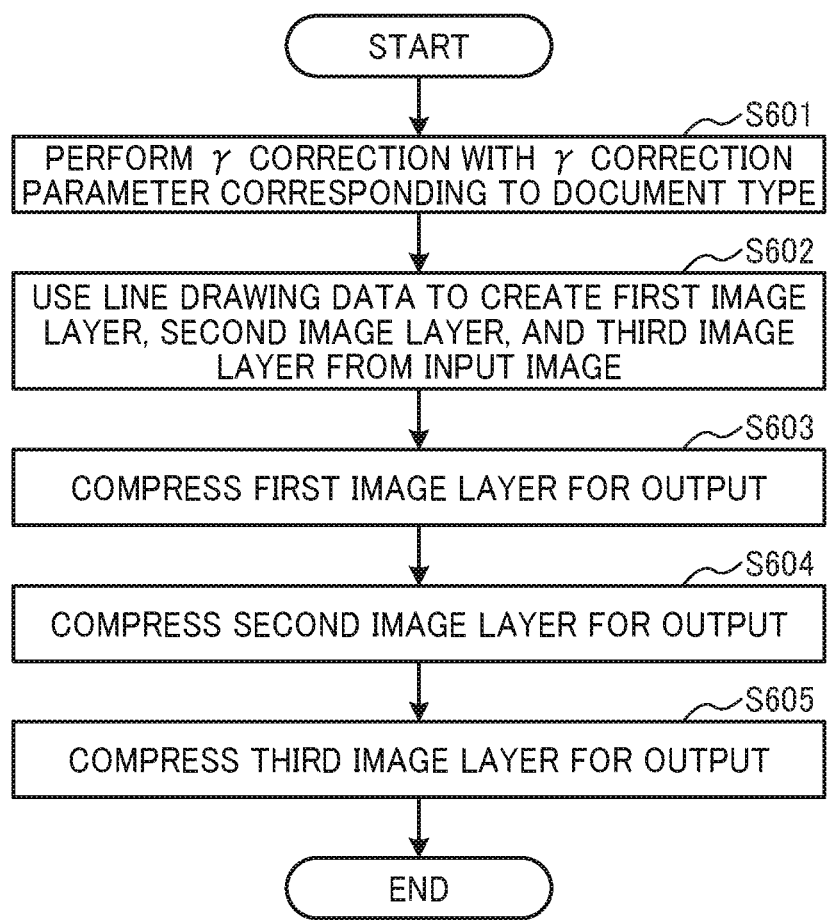
FIG. 16 is a flowchart illustrating an example of image compression processing in a compression processing unit.
Figure 17A:
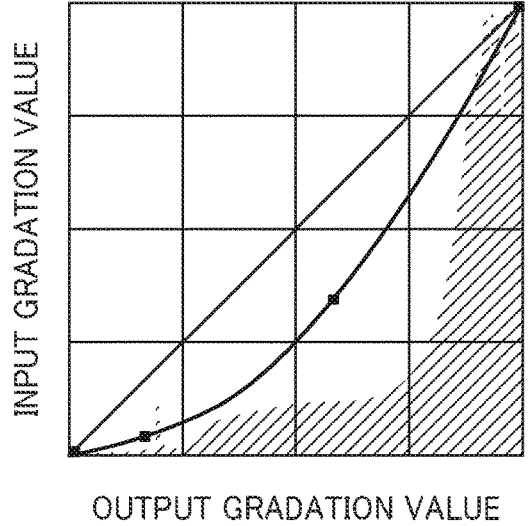
FIGS. 17A to 17D are graphs illustrating examples of $\gamma$ correction tables.
Figure 17B:
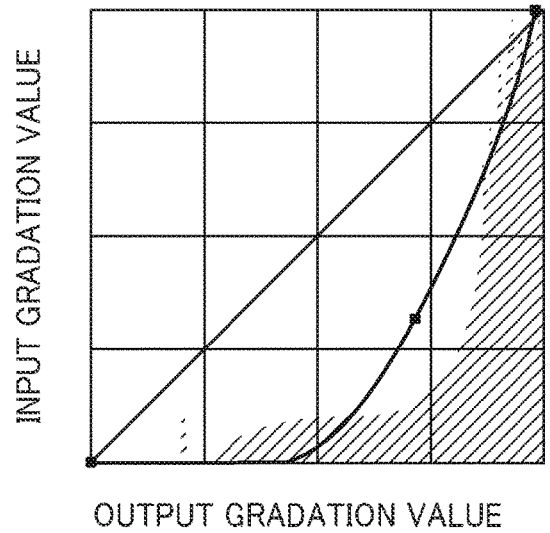
Figure 17C:
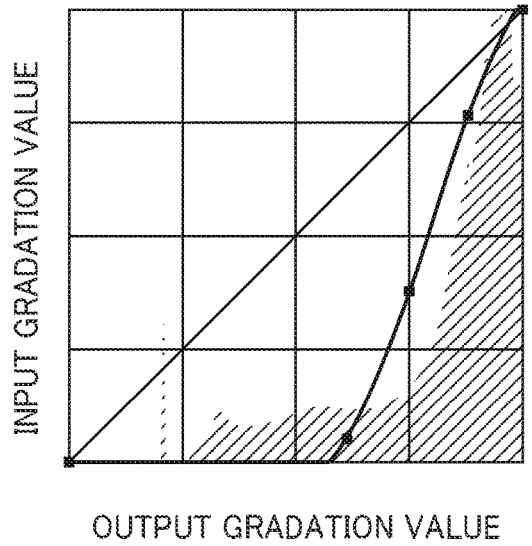
Figure 17D:
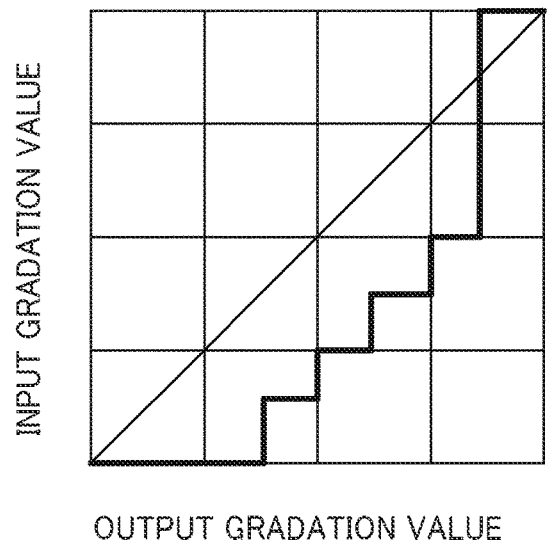

FIG. 16 is a flowchart illustrating an example of image compression processing in the compression processing unit 16. As illustrated in FIG. 16, the compression processing unit 16 performs a γ correction with a γ correction parameter depending on the document type (step S601). In the present embodiment, the γ correction parameters are prepared in advance for each document type. FIGS. 17A to 17D are graphs illustrating examples of data tables (γ correction tables) specifying the γ correction parameters.

Next, the compression processing unit 16 uses the line drawing data to create the above described first image layer, the above described second image layer, and the above described third image layer from the input image Im0 (step S602). Next, the compression processing unit 16 compresses and outputs the first image layer (step S603). Next, the compression processing unit 16 compresses and outputs the second image layer (step S604). Next, the compression processing unit 16 compresses and outputs the third image layer (step S605).

The relation between the pattern of the document type and the γ correction is described below. In the case where there are four document types, which are (1) the character only document, (2) the newspaper document, (3) the pale document, and (4) other documents, the image is darkened by the γ correction in the following order.

The pale document>other documents>the newspaper document with a hollow character>the newspaper document without a hollow character>the character only document For the character only document, the background density is reduced and the character density is increased to improve readability. For the newspaper document without the hollow character, the background density is reduced and the character density is increased to improve readability. In addition, when the user specifies to remove the background, the newspaper background may be turned white while leaving only a character. This makes it possible to reduce toner when printing a PDF file, which is thus friendly to the environment. For the newspaper document with the hollow character, since there are the hollow character, compared with the newspaper document without the hollow character, the background density is increased to improve readability of the hollow character. Gamma correction is switched based on the presence or absence of the hollow character. In addition, when the user specifies to remove the background, the newspaper background may be turned white while leaving only a character. This makes it possible to reduce toner when printing a PDF file, which is thus friendly to the environment. For the pale document, both the background density and the character density are increased to provide an improved appearance. At this time, both the background density and the character density are increased from those of other documents. When the table rectangle occupies 50% or more in the document, and when the ruled line color of the table is black and the cell color is white, the γ correction may be made darker. For other documents, both the background density and the character density are increased to provide an improved appearance.

As described above, in the present embodiment, the method of conforming the colors of the elements of the table is switched based on the data of the elements in the table detected from the multi-value image. Thereby, it is possible to improve the image quality and the compression ratio of the constituent elements in the table included in the multi-value image.

Although a specific embodiment of the present disclosure is described above, the present disclosure is not limited to the embodiment described above as is but may be realized with changes of components when implemented without departing from the scope of the present disclosure. Furthermore, by an appropriate combination of a plurality of the constituent elements disclosed in the embodiments, various inventions can be formed. For example, some constituent elements may be deleted from the constituent elements illustrated in the embodiments.

A program executed on the image processing apparatus 1 according to the embodiment described above may be configured to be provided as being recorded as a file in an installable format or an executable format on a computer-readable recording medium, such as a compact disk-read only memory (CD-ROM), a flexible disk (FD), a compact disk-recordable (CD-R), a digital versatile disk (DVD), and a universal serial bus (USB). The program may be provided or distributed via a network such as the internet. Alternatively, the program of the embodiment may be provided by previously installing in a ROM, etc.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus comprising:
   a detector to detect, from a multi-value image, a table that can display a character in each of a plurality of cells delimited by a plurality of ruled lines;
   a conformation unit that determines how to conform a color of a constituent element in the table based on information of the element in the table detected by the detector;
   a first creation unit to binarize the multi-value image to extract an object with a lower luminance than a background of the multi-value image and create a first image; and
   a second creation unit to binarize the multi-value image to extract an object with a higher luminance than the background of the multi-value image and create a second image,
   wherein the detector detects the table based on the first image and deletes a line drawing included in the second image that overlaps an area of the table if the element in the table satisfies a predetermined condition.

2. The image processing apparatus according to claim 1, wherein the conformation unit determines whether to conform the color of the element in the table based on a number of colors of the element in the table.

3. The image processing apparatus according to claim 2, wherein the conformation unit further determines whether to conform a color of the ruled line based on a number of colors of the ruled line included in the table.

4. The image processing apparatus according to claim 3, wherein, when a target ruled line of the plurality of ruled lines has one color, the conformation unit fills the target ruled line with the one color,
when the target ruled line has two colors, a first color of the two colors corresponds to the target ruled line, and a second color of the two colors corresponds to a cell, the conformation unit conforms the two colors of the target ruled line to the first color,
when the target ruled line has two or more colors, and the two or more colors include a color that does not correspond to the ruled line and the cell, the conformation unit determines not to change the two or more colors of the target ruled line.

5. The image processing apparatus according to claim 2, wherein the conformation unit determines whether to conform a color of a character based on a number of colors of the character included in the table.

6. The image processing apparatus according to claim 2, wherein the conformation unit determines whether to conform a color of a cell based on a number of colors of the cell included in the table.

7. The image processing apparatus according to claim 1, wherein the conformation unit determines whether to conform the color of the constituent element in the table based on a document type.

8. The image processing apparatus according to claim 1, wherein the detector detects the table based on the second image and deletes a line drawing included in the first image that overlaps an area of the table when the element in the table satisfies another predetermined condition.

9. An image processing method comprising:
   detecting, from a multi-value image, a table that can display a character in each of a plurality of cells delimited by a plurality of ruled lines;
   switching a method of conforming a color of a constituent element in the table based on information of the element in the table detected by the detecting;
   binarizing the multi-value image to extract an object with a lower luminance than a background of the multi-value image to create a first image;
   binarizing the multi-value image to extract an object with a higher luminance than the background of the multi-value image to create a second image;
   detecting the table based on the first image; and
   deleting a line drawing included in the second image that overlaps an area of the table if the element in the table satisfies a predetermined condition.

10. A non-transitory recording medium including a computer program causing a computer to execute:
   detecting, from a multi-value image, a table that can display a character in each of a plurality of cells delimited by a plurality of ruled lines;
   switching a method of conforming a color of a constituent element in the table based on information of the element in the table detected by the detecting
   binarizing the multi-value image to extract an object with a lower luminance than a background of the multi-value image to create a first image;
   binarizing the multi-value image to extract an object with a higher luminance than the background of the multi-value image to create a second image;
   detecting the table based on the first image; and
   deleting a line drawing included in the second image that overlaps an area of the table if the element in the table satisfies a predetermined condition.

* * * * *